(12) United States Patent
Olander et al.

(10) Patent No.: US 7,774,697 B2
(45) Date of Patent: Aug. 10, 2010

(54) SYSTEM AND METHOD FOR STRUCTURING DISTRIBUTED APPLICATIONS

(75) Inventors: Daryl B. Olander, Boulder, CO (US); Richard Feit, Boulder, CO (US); Edward O'Neil, Boulder, CO (US); Sathyanarayana Giridhar, Sammamish, WA (US); Jason Howes, Somerville, MA (US); Douglas Dew, Champaign, IL (US); Thomas A. Cook, Boulder, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 639 days.

(21) Appl. No.: 10/780,340

(22) Filed: Feb. 17, 2004

(65) Prior Publication Data

US 2005/0240863 A1 Oct. 27, 2005

Related U.S. Application Data

(60) Provisional application No. 60/450,226, filed on Feb. 25, 2003.

(51) Int. Cl.
*G06F 17/00* (2006.01)
(52) U.S. Cl. .................. 715/234; 715/230; 715/243; 715/253
(58) Field of Classification Search .................. 715/526, 715/511; 717/101, 114
See application file for complete search history.

(56) References Cited

U.S. PATENT DOCUMENTS

| | | | |
|---|---|---|---|
| 5,321,841 A | 6/1994 | East et al. | |
| 5,469,562 A | 11/1995 | Saether | |
| 5,604,860 A | 2/1997 | McLaughlin et al. | |
| 5,630,131 A | 5/1997 | Palevich et al. | |
| 5,748,975 A | 5/1998 | Van De Vanter | 715/531 |
| 5,801,958 A | 9/1998 | Dangelo et al. | |
| 5,835,769 A | 11/1998 | Jervis et al. | 717/113 |
| 5,836,014 A | 11/1998 | Faiman, Jr. | |
| 5,862,327 A | 1/1999 | Kwang et al. | 395/200.33 |
| 5,867,822 A | 2/1999 | Sankar | |
| 5,944,794 A | 8/1999 | Okamoto et al. | |
| 5,950,010 A | 9/1999 | Hesse et al. | 395/712 |
| 5,961,593 A | 10/1999 | Gabber et al. | |
| 5,966,535 A | 10/1999 | Benedikt et al. | |
| 6,012,083 A | 1/2000 | Savitzky et al. | |
| 6,016,495 A | 1/2000 | McKeehan et al. | |
| 6,018,730 A | 1/2000 | Nichols et al. | |
| 6,023,578 A | 2/2000 | Birsan et al. | |

(Continued)

FOREIGN PATENT DOCUMENTS

CA 2248634 3/2000

(Continued)

OTHER PUBLICATIONS

Barry Nusbaum, WebSphere Application Servers: Standard and Advanced Editions, Jul. 1999, IBM, pp. 1-28 and 91-119.*

(Continued)

*Primary Examiner*—Stephen S Hong
*Assistant Examiner*—Matthew J Ludwig
(74) *Attorney, Agent, or Firm*—Fliesler Meyer LLP

(57) ABSTRACT

A system and method for accepting a communication, comprising providing the communication to a controller, associating a model with said communication, determining a state of the model based on said communication, providing a view based on the state of the model, and wherein the view is a page in a page group.

21 Claims, 11 Drawing Sheets

U.S. PATENT DOCUMENTS

| | | |
|---|---|---|
| 6,023,722 A | 2/2000 | Colyer .................. 709/201 |
| 6,029,000 A | 2/2000 | Woolsey et al. |
| 6,044,217 A | 3/2000 | Brealey et al. ............. 717/107 |
| 6,067,548 A | 5/2000 | Cheng .................. 707/103 |
| 6,067,623 A | 5/2000 | Blakley et al. |
| 6,070,184 A | 5/2000 | Blount et al. |
| 6,092,102 A | 7/2000 | Wagner |
| 6,119,149 A | 9/2000 | Notani .................. 709/205 |
| 6,141,686 A | 10/2000 | Jackowski ................ 709/224 |
| 6,141,701 A | 10/2000 | Whitney |
| 6,148,336 A | 11/2000 | Thomas et al. |
| 6,185,734 B1 | 2/2001 | Saboff et al. |
| 6,212,546 B1 | 4/2001 | Starkovich et al. |
| 6,222,533 B1 | 4/2001 | Notani et al. ............... 345/329 |
| 6,226,675 B1 | 5/2001 | Meltzer et al. ............. 709/223 |
| 6,230,287 B1 | 5/2001 | Pinard et al. .................. 714/31 |
| 6,230,309 B1 | 5/2001 | Turner et al. .................. 717/1 |
| 6,237,135 B1 | 5/2001 | Timbol .................. 717/1 |
| 6,243,737 B1 | 6/2001 | Flanagan et al. |
| 6,282,711 B1 | 8/2001 | Halpern et al. ............. 717/11 |
| 6,292,932 B1 | 9/2001 | Baisley et al. |
| 6,311,327 B1 | 10/2001 | O'Brien et al. |
| 6,324,681 B1 | 11/2001 | Sebesta et al. ................ 717/1 |
| 6,330,569 B1 | 12/2001 | Baisley et al. |
| 6,334,114 B1 | 12/2001 | Jacobs et al. |
| 6,338,064 B1 | 1/2002 | Ault et al. |
| 6,343,265 B1 | 1/2002 | Glebov et al. |
| 6,349,408 B1 | 2/2002 | Smith .................. 717/11 |
| 6,353,923 B1 | 3/2002 | Bogle et al. ................ 717/128 |
| 6,360,358 B1 | 3/2002 | Elsbree et al. |
| 6,367,068 B1 | 4/2002 | Vaidyanathan et al. |
| 6,377,939 B1 | 4/2002 | Young |
| 6,393,605 B1 | 5/2002 | Loomans .................. 717/121 |
| 6,408,311 B1 | 6/2002 | Baisley et al. |
| 6,411,698 B1 | 6/2002 | Bauer et al. |
| 6,445,711 B1 | 9/2002 | Scheel et al. |
| 6,470,364 B1 | 10/2002 | Prinzing |
| 6,516,322 B1 | 2/2003 | Meredith |
| 6,549,949 B1 | 4/2003 | Bowman-Amuah ......... 709/236 |
| 6,560,769 B1 | 5/2003 | Moore et al. |
| 6,567,738 B2 | 5/2003 | Gopp et al. |
| 6,584,454 B1 | 6/2003 | Hummel, Jr. et al. |
| 6,594,693 B1 | 7/2003 | Borwankar |
| 6,594,700 B1 | 7/2003 | Graham et al. |
| 6,601,113 B1 | 7/2003 | Koistinen et al. |
| 6,604,198 B1 | 8/2003 | Beckman et al. |
| 6,609,115 B1 | 8/2003 | Mehring et al. |
| 6,615,258 B1 | 9/2003 | Barry et al. |
| 6,636,491 B1 | 10/2003 | Kari et al. |
| 6,637,020 B1 | 10/2003 | Hammond |
| 6,643,652 B2 | 11/2003 | Helgeson et al. |
| 6,654,932 B1 | 11/2003 | Bahrs et al. |
| 6,662,357 B1 | 12/2003 | Bowman-Amuah |
| 6,678,518 B2 | 1/2004 | Eerola |
| 6,684,388 B1 | 1/2004 | Gupta et al. |
| 6,687,702 B2 | 2/2004 | Vaitheeswaran et al. |
| 6,687,848 B1 | 2/2004 | Najmi |
| 6,721,740 B1 | 4/2004 | Skinner et al. |
| 6,721,779 B1 | 4/2004 | Maffeis |
| 6,732,237 B1 | 5/2004 | Jacobs et al. |
| 6,748,420 B1 | 6/2004 | Quatrano et al. |
| 6,754,884 B1 | 6/2004 | Lucas et al. |
| 6,757,689 B2 | 6/2004 | Battas et al. |
| 6,789,054 B1 | 9/2004 | Makhlouf |
| 6,795,967 B1 | 9/2004 | Evans et al. |
| 6,799,718 B2 | 10/2004 | Chan et al. |
| 6,802,000 B1 | 10/2004 | Greene et al. |
| 6,804,686 B1 * | 10/2004 | Stone et al. ............. 707/104.1 |
| 6,823,495 B1 | 11/2004 | Vedula et al. |
| 6,832,238 B1 | 12/2004 | Sharma et al. |
| 6,836,883 B1 | 12/2004 | Abrams et al. |
| 6,847,981 B2 | 1/2005 | Song et al. |
| 6,850,979 B1 | 2/2005 | Saulpaugh et al. |
| 6,859,180 B1 | 2/2005 | Rivera |
| 6,874,143 B1 | 3/2005 | Murray et al. |
| 6,889,244 B1 | 5/2005 | Gaither et al. |
| 6,915,519 B2 | 7/2005 | Williamson et al. |
| 6,918,084 B1 | 7/2005 | Slaughter et al. |
| 6,922,827 B2 | 7/2005 | Vasilik et al. |
| 6,950,872 B2 | 9/2005 | Todd, II |
| 6,959,307 B2 | 10/2005 | Apte |
| 6,963,914 B1 | 11/2005 | Breitbart et al. |
| 6,971,096 B1 | 11/2005 | Ankireddipally et al. |
| 6,976,086 B2 | 12/2005 | Sadeghi et al. |
| 7,000,219 B2 | 2/2006 | Barrett et al. |
| 7,017,146 B2 | 3/2006 | Dellarocas et al. |
| 7,043,722 B2 | 5/2006 | Bau |
| 7,051,072 B2 | 5/2006 | Stewart et al. |
| 7,051,316 B2 | 5/2006 | Charisius et al. |
| 7,054,858 B2 | 5/2006 | Sutherland |
| 7,062,718 B2 | 6/2006 | Kodosky et al. |
| 7,069,507 B1 | 6/2006 | Alcazar et al. |
| 7,072,934 B2 | 7/2006 | Helgeson et al. |
| 7,073,167 B2 | 7/2006 | Iwashita |
| 7,076,772 B2 | 7/2006 | Zatloukal |
| 7,080,092 B2 * | 7/2006 | Upton .................. 707/102 |
| 7,089,563 B2 * | 8/2006 | Nagel et al. ................. 719/313 |
| 7,089,584 B1 | 8/2006 | Sharma |
| 7,096,422 B2 | 8/2006 | Rothschiller et al. |
| 7,107,578 B1 | 9/2006 | Alpern |
| 7,111,243 B1 | 9/2006 | Ballard et al. |
| 7,117,504 B2 | 10/2006 | Smith et al. |
| 7,127,704 B2 | 10/2006 | Van De Vanter et al. |
| 7,143,186 B2 | 11/2006 | Stewart et al. |
| 7,146,422 B1 | 12/2006 | Marlatt et al. |
| 7,155,705 B1 * | 12/2006 | Hershberg et al. .......... 717/137 |
| 7,165,041 B1 | 1/2007 | Guheen et al. |
| 7,181,731 B2 | 2/2007 | Pace et al. |
| 7,184,967 B1 | 2/2007 | Mital et al. |
| 7,240,331 B2 | 7/2007 | Vion-Dury et al. |
| 7,260,599 B2 | 8/2007 | Bauch et al. |
| 7,260,818 B1 | 8/2007 | Iterum et al. |
| 2002/0004848 A1 | 1/2002 | Sudarshan et al. |
| 2002/0010781 A1 | 1/2002 | Tuatini |
| 2002/0010803 A1 | 1/2002 | Oberstein et al. |
| 2002/0016759 A1 | 2/2002 | Macready et al. |
| 2002/0035604 A1 | 3/2002 | Cohen et al. |
| 2002/0049788 A1 | 4/2002 | Lipkin et al. |
| 2002/0073080 A1 | 6/2002 | Lipkin |
| 2002/0073236 A1 | 6/2002 | Helgeson et al. |
| 2002/0073396 A1 | 6/2002 | Crupi et al. |
| 2002/0078365 A1 | 6/2002 | Burnett et al. |
| 2002/0083075 A1 | 6/2002 | Brummel et al. |
| 2002/0111922 A1 | 8/2002 | Young et al. |
| 2002/0116454 A1 | 8/2002 | Dyla et al. |
| 2002/0120685 A1 | 8/2002 | Srivastava et al. |
| 2002/0143960 A1 | 10/2002 | Goren et al. |
| 2002/0152106 A1 | 10/2002 | Stoxen et al. |
| 2002/0161826 A1 | 10/2002 | Arteaga et al. |
| 2002/0165936 A1 | 11/2002 | Alston et al. |
| 2002/0169644 A1 | 11/2002 | Greene |
| 2002/0174178 A1 | 11/2002 | Stawikowski |
| 2002/0174241 A1 | 11/2002 | Beged-Dov et al. |
| 2002/0184610 A1 | 12/2002 | Chong et al. |
| 2002/0188486 A1 | 12/2002 | Gil et al. |
| 2002/0188729 A1 * | 12/2002 | Zhou et al. .................. 709/227 |
| 2002/0194244 A1 | 12/2002 | Raventos |
| 2002/0194267 A1 | 12/2002 | Flesner et al. |
| 2002/0194495 A1 | 12/2002 | Gladstone et al. |
| 2003/0004746 A1 | 1/2003 | Kheirolomoom et al. |
| 2003/0005181 A1 | 1/2003 | Bau, III et al. |
| 2003/0014439 A1 | 1/2003 | Boughannam |
| 2003/0018661 A1 | 1/2003 | Darugar |
| 2003/0018665 A1 | 1/2003 | Dovin et al. |

| | | | |
|---|---|---|---|
| 2003/0018832 A1 | 1/2003 | Amirisetty et al. | |
| 2003/0018963 A1 | 1/2003 | Ashworth et al. | |
| 2003/0023957 A1 | 1/2003 | Bau, III et al. | |
| 2003/0028579 A1 | 2/2003 | Kulkarni et al. | |
| 2003/0041198 A1 | 2/2003 | Exton et al. | |
| 2003/0043191 A1 | 3/2003 | Tinsley et al. | |
| 2003/0046266 A1 | 3/2003 | Mullins | |
| 2003/0046591 A1 | 3/2003 | Asghari-Kamrani et al. | |
| 2003/0051066 A1 | 3/2003 | Pace et al. | |
| 2003/0055868 A1 | 3/2003 | Fletcher et al. | |
| 2003/0055878 A1 | 3/2003 | Fletcher et al. | |
| 2003/0074217 A1 | 4/2003 | Beisiegel et al. | |
| 2003/0079029 A1 | 4/2003 | Garimella et al. | |
| 2003/0084203 A1 | 5/2003 | Yoshida et al. | |
| 2003/0110117 A1 | 6/2003 | Saidenberg et al. | |
| 2003/0110446 A1 | 6/2003 | Nemer | |
| 2003/0126136 A1 | 7/2003 | Omoigui | |
| 2003/0149791 A1 | 8/2003 | Kane et al. | |
| 2003/0167358 A1 | 9/2003 | Marvin et al. | |
| 2003/0196168 A1 | 10/2003 | Hu | |
| 2004/0019645 A1 | 1/2004 | Goodman et al. | |
| 2004/0040011 A1 | 2/2004 | Bosworth et al. | |
| 2004/0078373 A1 | 4/2004 | Ghoneimy et al. | |
| 2004/0103406 A1 | 5/2004 | Patel | |
| 2004/0133660 A1 | 7/2004 | Junghuber et al. | |
| 2004/0148336 A1 | 7/2004 | Hubbard et al. | |
| 2004/0204976 A1 | 10/2004 | Oyama et al. | |
| 2004/0205566 A1* | 10/2004 | Aggarwal et al. | 715/513 |
| 2004/0216086 A1 | 10/2004 | Bau | |
| 2004/0225995 A1 | 11/2004 | Marvin et al. | |
| 2004/0260715 A1 | 12/2004 | Mongeon et al. | |
| 2005/0050068 A1 | 3/2005 | Vaschillo et al. | |
| 2005/0278585 A1 | 12/2005 | Spencer | |
| 2006/0206856 A1 | 9/2006 | Breeden et al. | |
| 2006/0234678 A1 | 10/2006 | Juitt et al. | |
| 2007/0038500 A1 | 2/2007 | Hammitt et al. | |

FOREIGN PATENT DOCUMENTS

| | | |
|---|---|---|
| WO | WO 9923558 | 5/1999 |
| WO | WO 0029924 | 5/2000 |
| WO | WO 01/90884 A2 | 11/2001 |

OTHER PUBLICATIONS

Blake; Rule-Driven Coordination Agents: "A Self-Configurable Agent Architecture for Distributed Control" IEEE, Mar. 2001, pp. 271-277.
Dahalin et al., "Workflow Interoperability Using Extensible Markup Language (XML)", IEEE, Jul. 2002, pp. 513-516.
Kunisetty, Workflow Modeling and Simulation Using and Extensible Object-Oriented Knowledge Based Management System, CiteSeer. 1996 pp. 1-60.
Lauer, Christophe "Introducing Microsoft DotNet" Jul. 2, 2002, pp. 4-5.
Mariucci, Marc ello. "Enterprise Application Server Development Environments.", Overview. University of Stuttgart. Oct. 10, 2000, p. 1-10.
Sun Microsystems. "IPlanet Application Server 6.0 White Paper", Technical Reference Guide. May 25, 2000, all, fig. on p. 20.
Roman, Ed and Rickard Oberg, "The Technical Benefits of EJB and J2EE Technologies over COM+ and Windows DNA." Dec. 1999, pp. 3-5, fig. 1.
Hewlett-Packard. "HP Application Server." technical guide version 8.0. 1999-2001, all.
Duvos, Enrique and Azer Bestavros. "An Infrastructure for the Dynamic Distribution of Web Applications and Services." Department of Computer Science, Boston University. Dec. 2000, pp. 4-12.
Paul, Laura Gibbons, "RosettaNet: Teaching Business to Work Together", Oct. 1, 1999. http://www.developer.com/sml/article.php/616641.
"Introducing Microsoft DotNet", by Christopher Lauer, Jul. 2, 2002, http://webarchive.org/web/20020702162429/http://www.freevbcode.comShowCode.as;?ID=2171.
Sosnoski, "XML and Java technologies: Data binding, Part 1: Code generation approaches—JAXB and more", IBM, pp. 1-11, Jan. 2003.
Erich Liebmann, et al., "Adaptive Data Dissemination and Caching for Edge Service Architectures built with the J2EE", Mar. 2004, ACM Press, 2004 ACM Symposiumon Applied Computing, pp. 1717-1724.
Chen et al., "eCo Architecture for Electronic Commerce Interoperability", Jun. 29, 1999, CommerceNet. Part 1, pp. 1-54.
Chen et al., "eCo Architecture for Electronic Commerce Interoperability", Jun. 29, 1999, CommerceNet. Part 2, pp. 55-107.
Mohan et al., "ARIES: A Transaction Recovery Method Supporting Fine-Granularity Locking and Partial Rollbacks Using Write-Ahead Logging", ACM Transactions on Database Systems (TODS), Mar. 1992, pp. 94-162, vol. 17, Issue 1.
Java Debug Interface—definition, retrieved from <URL http://java.sun.com/j2se/1.4.2/docs/guide/jpda/jdi/overview-summary.html on Feb. 21, 2007, pp. 1-3.
Embury, et al., "Assisting the Comprehension of Legacy Transactions," Proceedings of the Eighth Working Conference on Reverse Engineering, Oct. 2-5, 2001, pp. 345-354.
Mays, et al., "A Persistent Store for Large Shared Knowledge Bases," IEEE Transactions on Knowledge and Data Engineering, vol. 3, No. 1, Mar. 1991, pp. 33-41.
Tang, et al., "Integrating Remote Invocation and Distributed Shared State," Proceedings of the 18th International Parallel and Distributed Processing Symposium, (IPDPS '04), Apr. 26-30, 2004, 10 pages.
Kilgore, "Multi-Language, Open-Source Modeling Using the Microsoft .Net Architecture," Proceedings of the 2002 Winter Simulation Conference, Dec. 8-11, 2002, IEEE, vol. 1, pp. 629-633.
Bea Systems, Inc., "Transforming Data Using Xquery Mapper", BEA AquaLogic Service Bus 2.0 Documentation, 2006, 19 pages.
Stylus Studio, "Xquery Mapper", 2007, 6 pages, Stylus Studios.
Altova, "XML-toXML Mapping", 2007, 3 pages, Altova Map Force.
Jamper, "Jamper-Java XML Mapper", 2007, 4 pages, Sourceforge.
Bogunovic, "A Programming Model for Composing Data Flow Collaborative Applications", Proceedings of the IEEE International Conference on Engineering of Computer Based Systems, Mar. 7-12, 1999, pp. 106-112.
Sung et al., "A Multimedia Authoring Tool for the Internet", IEEE Transactions on Consumer Electronics, 1997. pp. 304-308.
Smith, et al. "Marching Towards a Software Reuse Future", ACM Ada Letters, Nov./Dec. 1994, pp. 62-72vol. 14, No. 6.
Supplementary European Search Report for EP 02784131.1 dated Aug. 8, 2007, 4 pages.
Sharma, "J2EE Connector Architecture Specification, Version 1.0 Final Release", Java 2 Enterprise Edition, Aug. 2001, 90 pages, Sun Microsystems.
Allamaraju, et al., "Professional Java Server Programming J2EE 1.3 Edition", Sep. 2001, pp. 1009-1057, WROX.
Microsoft, "Microsoft.net Framework", Microsoft Corporation, 2001, 54 pages.
Willink, "Meta-Compilation for C ++", University of Surrey, Jan. 4, 2000, 379 pages.
Alonso et al., "Advanced Transaction Models in Workflow Contexts", IEEE, Feb. 1996, Proceedings of 12th International Conference on Data Engineering, retrieved from: http://citeseer.ist.psu.edualonso96advanced.html., pp. 574-581.
Van Der Aalst et al., "XML Based Schema Definition for Support of Inter-Organizational Workflow", University of Colorado and University of Eindhoven report, 2000, retrieved from http://citeseer.ist.psu.edu/venderaalst00mxl.html, 39 pages.
Plaindoux, "XML Transducers in Java", May 2002, The Eleventh International World Wide Conference, retrieved from: http://www2002.org/CDROM/poster/132/index.html., 6 pages.
Van Der Aalst et al., Verification of XRL: An XML-Based Workflow Language, IEEE, Jul. 2001, pp. 427-432.
Peltz, "Web Services Orchestration" Hewlett-Packard, Jan. 2003, 20 pages.
Muller, "Event-Oriented Dynamic Adaptation of Workflows: Model, Architecture and Implementation", 2002, 351 pages, University of Leipzig, Germany.

* cited by examiner

```
1 <%@ taglib uri="netui-tags-html.tld" prefix="neui" %>
2
3 <html>
4    <head>
5    </head>
6    <body>
7       <netui:form>
8          <table>
9             <tr>
10                <td>Title:</td>
11                <td><netui:textBox dataSource="title"/></td>
12             </tr>
13             <tr>
14                <td>Start Date:</td>
15                <td><netui:textBox dataSource="startDate"/></td>
16             </tr>
17             <tr>
18                <td>
19                   <netui:button action="previous" value="Previous"/>
20                   <netui:button action="next" value="Next"/>
21                </td>
22             </tr>
23          </table>
24       </netui:form>
25    </body>
26 </html>
```

Design View | Source View

Figure 9

SYSTEM AND METHOD FOR STRUCTURING DISTRIBUTED APPLICATIONS

CLAIM OF PRIORITY

This application claims priority from the following application, which is hereby incorporated by reference in its entirety:

SYSTEM AND METHOD FOR STRUCTURING DISTRIBUTED APPLICATIONS, U.S. Application No. 60/450,226, Inventors: Daryl Olander, et al., filed on Feb. 25, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates generally to software tools for portal development.

BACKGROUND

Typical frameworks for structuring distributed client/server applications may not be appropriate for the heavily multi-threaded environment of a web/application server where different users may be executing the same application on the same server. In addition, such frameworks may not cleanly separate business logic from rendering and control flow, thus making it difficult to compliment the framework with a visual Integrated Development Environment.

BRIEF DESCRIPTION OF THE DRAWINGS

FIG. 9 is an exemplary JavaServer Page for rendering and binding the form of FIG. 8 in an embodiment.

DETAILED DESCRIPTION

Figure 1:
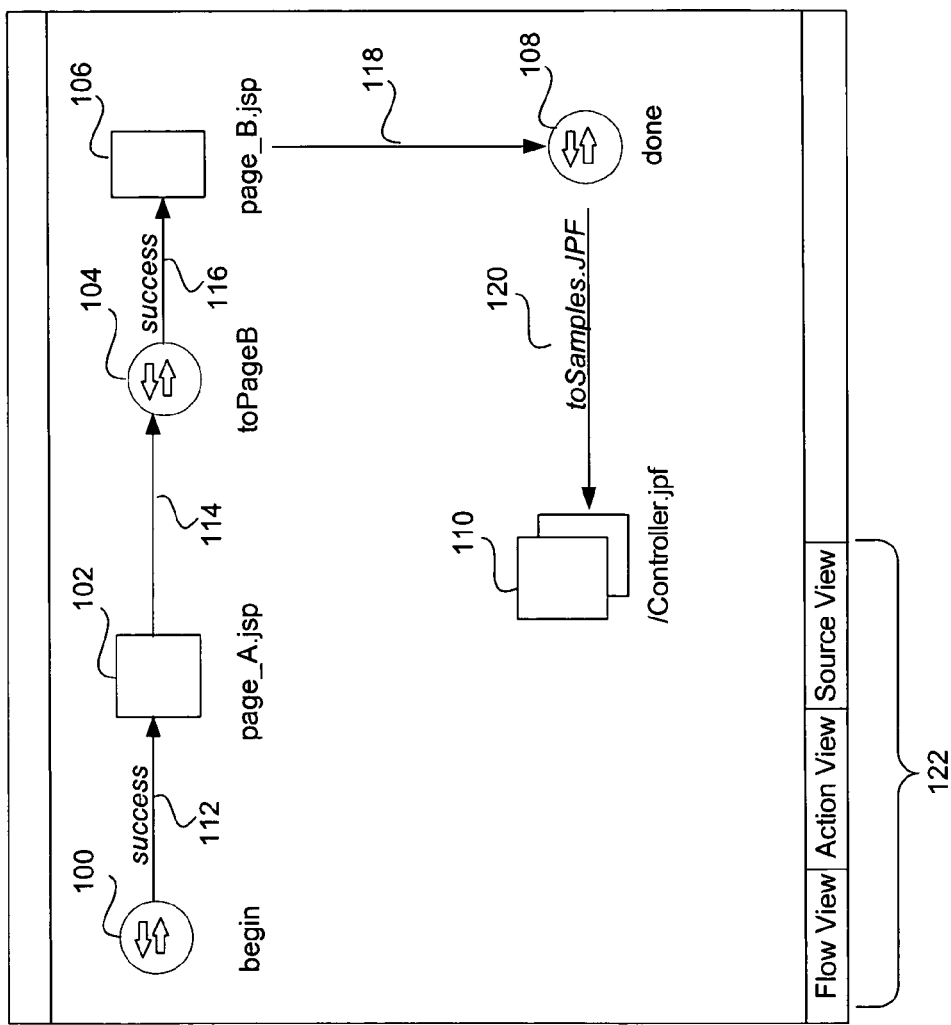
FIG. 1 is an illustration of an exemplary Integrated Development Environment graphical view of an exemplary page flow in an embodiment.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In one embodiment, page flows allow a software developer to separate user interface code from navigational control and other business logic. User interface code can be placed where it belongs (e.g., in JSP files). Navigational control can be implemented easily in a page flow's single controller file, which is the nerve center of (a component of) your web application. A page controller file is a special Java file that uses a JPF file extension. Business logic can be implemented in the page controller file, or in Java controls that you call from JPF files.

The separation of presentation and business logic offers a big advantage to development teams. For example, site flow updates can be made in a single JPF file, instead of having to search through many JSP files and make multiple updates. In an Integrated Development Environment (IDE), a user can as easily navigate between page flows as between individual JSP pages. This allows you to group related web pages under one page flow, and create functionally modular web components. This approach to organizing the entities that comprise web applications makes it much easier to maintain and enhance web applications by minimizing the number of files that have to be updated to implement changes, and lowers the cost of maintaining and enhancing applications.

Another advantage of page flows is that an instance of the page flow controller class is kept alive on a per-user-session basis while the user is navigating within the scope of the page flow. This instance ends when the user exits from the page flow. You can use instance member variables in page flow classes to hold user session state.

Page flows can be the main part of a web application software engineering model that enables architects and developers to design and implement web applications by using an easy-to-understand, easy-to-maintain, fill-in-the-blanks pattern. Software architects may use page flows to design the overall structure of web applications and to create a fill-in-the-blanks skeletal version. For example, architects may create skeletal page flow classes that define only the basic relationships among page flow files, temporarily containing only method signatures, and no method bodies. Developers may then fill in the empty method bodies of the page flow classes to complete the implementation of the web applications.

In one embodiment, the system can be built on top of a general purpose framework, such as the Apache Struts Web Application Framework available from http://jakarta.apache.org/struts/. In one embodiment, a page flow is a Java class that controls the behavior of a web application through the use of specially designed annotations and methods. The directory that contains the page flow class also includes the JavaServer Pages (JSPs) used in the page flow. For a JSP to be considered part of a page flow, it can reside within the page flow directory. The JSP files use special tags which help bind to data and business logic actions. The actions in the JSP correspond to action methods that are defined in the page flow. These action methods implement code that can result in site navigation, passing data, or invoking back-end business logic. Significantly, the business logic in the page flow class is separate from the presentation code defined in the JSP files.

In one embodiment, an IDE can provide graphical and code-level tools to simplify the development cycle. While page flows give you access to advanced features of J2EE, you do not have to be a J2EE expert to quickly develop and deploy Java-based applications built on page flows. Wizards can be used to create different types of page flows, generating the Java and JSP files that serve as a starting point for your work. Graphical tools let you draw the relationships between web components in a controller's Flow View. In Source View, syntax completion, validation, and other programmer's aids reduce the amount of work required to get your application running.

FIG. 1 is an illustration of an exemplary IDE graphical view of an exemplary flow view in one embodiment. In the IDE, the tabs 122 at the bottom of the window can be used to switch between the graphical views and source view. When a page flow is open, its graphical representation is displayed in a Flow View window. The Action View (not shown) allows a programmer to focus on a smaller portion of the page flow, for instance to examine a particular action and its form bean. The Source View (not shown) is where a programmer can customize the generated code and add business logic, or call controls that implement business logic.

In one embodiment, all page flow controller classes have a begin action method 100 that can define what happens each time this page flow is navigated to from a web page. In one embodiment, each JSP file that resides in a page flow's directory is shown on the flow view, and is represented by a rectangular icon with a folded upper-right corner (e.g., 102, 106). Action methods are represented as circular icons (e.g., 100, 104, 108). Other page flows/page groups are represented by icon 110. In this non-limiting example, page_A.jsp 102 is the first page that the user will see when the page flow's URL is accessed from a web browser. An arrow from an action icon to a JSP page icon indicates that the result of the action will load the target page (e.g., 112, 116). An arrow from a JSP page icon to an action icon indicates that the action is raised on the JSP page (e.g., 114, 118). An arrow from an action to another page flow indicates that the target page flow will be loaded (e.g., 120). The name of each action, page, or page flow can be shown below the icon. The name on the arrow next to the action's circular icon can correspond to the logical name of a Forward object that is returned by the action method.

In this example, the page flow class defines an action method 104 named toPageB. This action is raised by the JSP file page_A.jsp 102. For example, page_a.jsp could contain the following HTML code:

```
<%@ taglib uri="netui-tags-html.tld" prefix="netui"%>
<h3>This is page_A.jsp</h3>
<p>
<netui:anchor action="toPageB">Link to
    page_B.jsp</netui:anchor>
```

A special JSP tag library named netui-tags-html.tld is referenced. The <netui:anchor . . . > tag used here is simply associating an action with a hyperlink that it will generate. The toPageB action method is defined as follows:

```
import com.bea.wlw.netui.pageflow.PageFlowController;
import com.bea.wlw.netui.pageflow.Forward;
public class SimpleflowController extends
PageFlowController
{
    /**
    * @jpf:action
    * @jpf:forward name="success" path="page_B.jsp"
    */
    public Forward toPageB( )
    {
        return new Forward( "success" );
    }
}
```

In one embodiment, action methods return objects of type com.bea.wlw.netui.pageflow. Forward. When the toPageB action is raised in page_A.jsp, the system detects the action and invokes the toPageB action method. This action method is coded to return a Forward object with the name "success". Notice that this name matches the name on the corresponding action arrow in Flow View. The two @jpf tags that appear on the lines above this action method are annotations that are enclosed in Javadoc comments. The @jpf:action tag indicates that the toPageB method is an action method. The @jpf: forward tag describes the behavior of that method.

Figure 2:
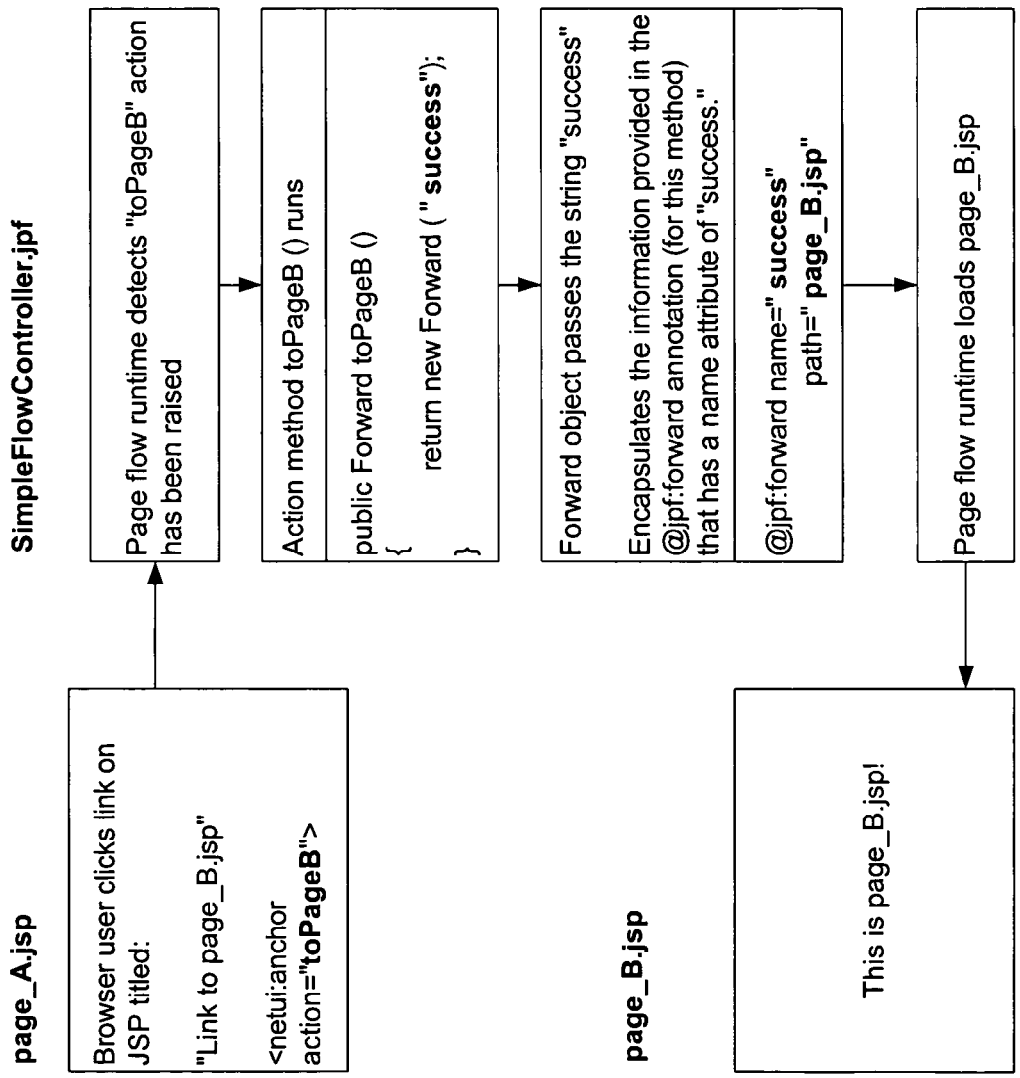
FIG. 2 is exemplary code generated automatically by an Integrated Development Environment in an embodiment.

A Forward object is returned by an action method to indicate to the page flow runtime that the action method wants the runtime to navigate to the location described by the Forward object. In this example, the Forward object passes the string "success", indicating that it should encapsulate the information provided in the @jpf:forward annotation (for this method) that has a name attribute of "success". On this annotation, the path attribute is used. The path attribute's value is "page_B.jsp", which causes the page flow controller to load page_B.jsp. This is summarized in FIG. 2. In one embodiment, the IDE can automatically generate the code in FIG. 2 as a result of creating a new page flow or JSP file from the graphical view.

In one embodiment, a page group is a logical grouping of related pages in a given web application. Page groups can serve the following purposes:

Control page flow between pages and other page groups.
Provide a way to group pages in a functional and/or logical way.
Provide a place to write application logic that should be separate from the GUI, such as calling a server side control, web service, or EJB.

Figure 3:
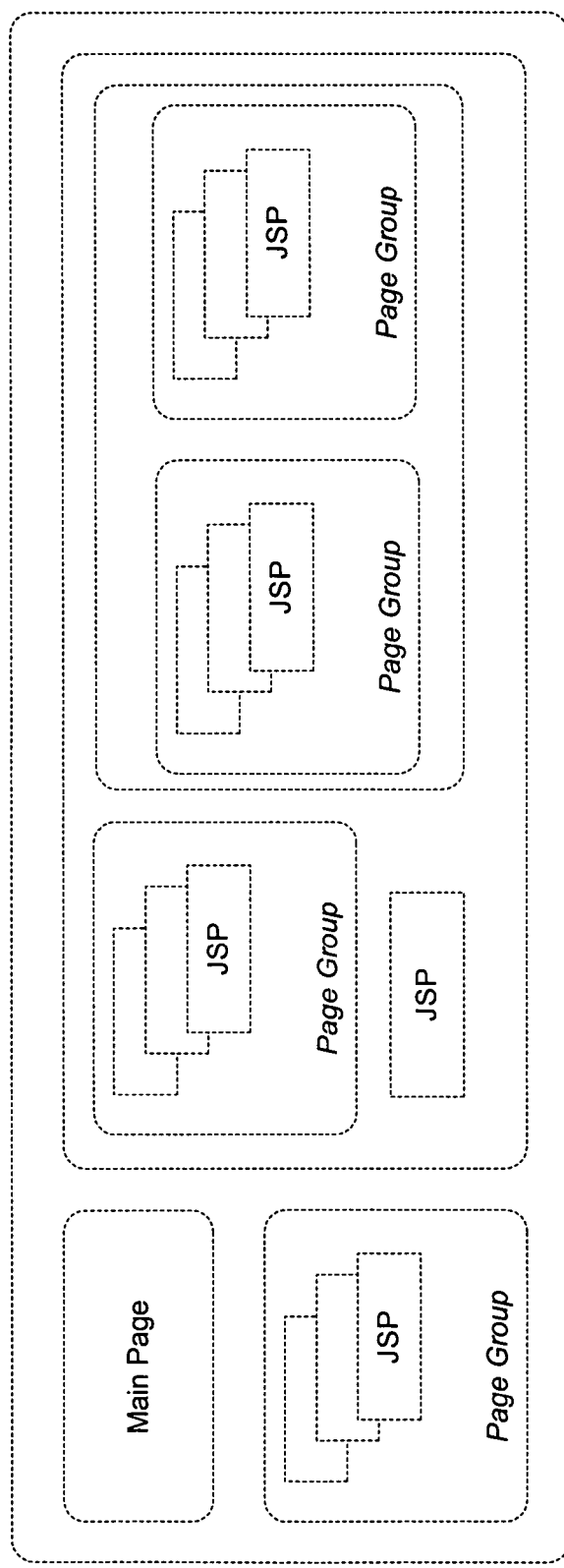
FIG. 3 is an illustration of exemplary page groups in an embodiment.

FIG. 3 is an illustration of exemplary page groups in an embodiment. From a design perspective page groups provide an ability to encapsulate a related set of functionality on a web site. For example, all of the pages involved in registering a new user for a site could be grouped together in a page group called "UserRegistration". When flowing to UserRegistration, other pages that refer to the UserRegistration page group don't have to worry about whether UserRegistration is a page or page group. They also don't have to know anything about business logic that may be executed by that page group. As FIG. 3 illustrates, page groups can have peer page groups and they can also contain other page groups, referred to as nested page groups. Nesting can be arbitrarily deep and each page group can contain either pages or child page groups or both.

Figure 4:
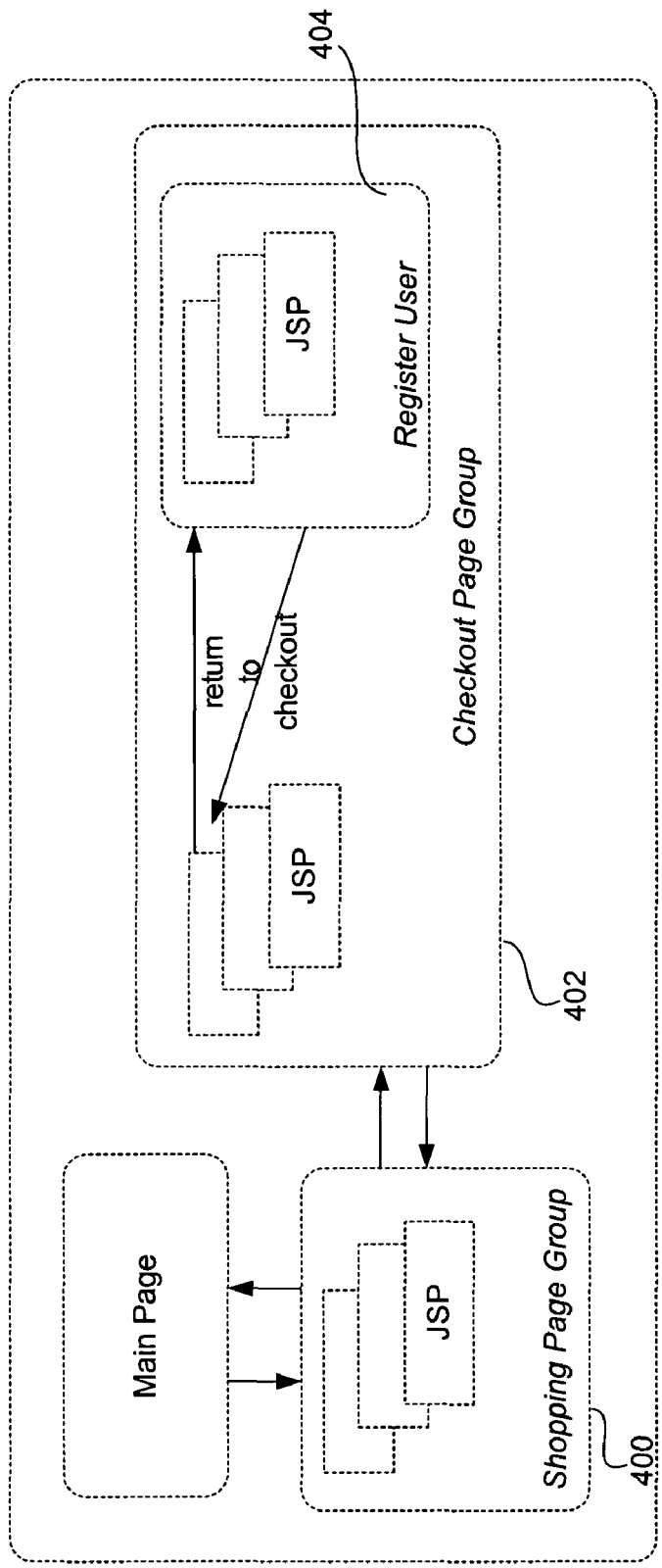
FIG. 4 is another illustration of exemplary page groups in an embodiment.

FIG. 4 is another illustration of page groups in an embodiment. This figure shows how nested page groups could be used to allow a new user to register with the site during shopping/checkout. In this non-limiting example, a user who has been shopping 400 on a website decides to buy the items in his shopping cart. The user is an unknown user of the site, so the page flow sends him to the page group 404 where new users register with the web site. After this task has been accomplished, he is returned back to where he was in his checkout process 402, with all appropriate state maintained for that page group.

In one embodiment, a page group can be represented by a Java class where page flow code and business logic coexist. Every time a page transition is initiated by a web browser user clicking a link or submitting a form, an application flow infrastructure can call a method on the appropriate page group to execute appropriate business logic and determine the destination page that should be shown to the user. These methods called by the application infrastructure are known as "commands". Commands are annotated to describe possible Destination objects that may be returned by the command, and they can return one of the Destination objects that they declare via those annotations. Destination objects are available as class-scoped fields in the page group, which makes it easy for a destination to be returned. By way of a non-limiting example, such a class might appear as follows:

```
public class MyGroup extends PageGroup
{
    /**
    *           @pageName search results.jspx
    *           @ pagePath */
    SearchPageNode searchPage;
    /**
    *           @command Search
    *           @destination searchPage
    */
    ...
    Destination search( )
    {
                // No need to instantiate a new page
                // group object. We just use the one
                // declared in our page group.
                return searchPage;
    }
}
```

In a page flow, page groups can behave much like pages. In one embodiment, both pages and page groups have one begin node, and one or more end nodes. Page groups may be entered via: the page group's begin node or a link that goes directly to a page in another page group. The former is preferred where encapsulation is of the most importance, but the latter is not prohibited if a case arises where that is the most efficient way of handling a page transition.

A page group can have multiple end nodes which can flow to different places. This is analogous to pages having many links which flow to different places. This similarity is beneficial from the standpoints of encapsulation and flow representation. From a flow representation standpoint this is nice because flows between pages and page groups have the same representation in the simplest case. From the encapsulation standpoint it is nice for the flow modeler to be able to treat both pages and page groups as interchangeable things. For example, a flow modeler could take a page and turn it into a page group (or vise versa) without affecting anything else in the flow.

Figure 5:
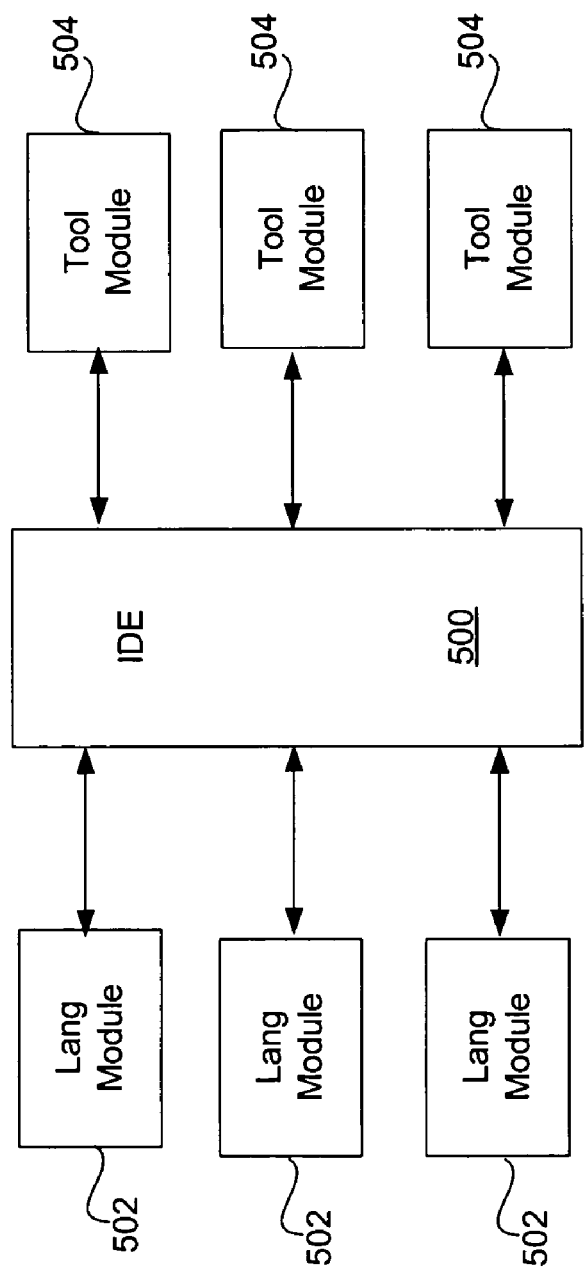
FIG. 5 is an illustration of an exemplary Integrated Development Environment in an embodiment.

FIG. 5 is an illustration of an exemplary IDE in an embodiment. In one embodiment, an IDE 500 can have one or more language modules 502 and one or more tool modules 504. Language modules and tool modules can integrate themselves into the IDE via a common interface such as a service provider interface (SPI). Language modules provide services to the IDE, such as syntactic and semantic error checking, compilation, name space services and dependency analysis. Exemplary language modules can be provided for Java, XML and Java annotations. Tool modules provide tools for software developers, such as graphical editors, debuggers, class browsers, etc. Exemplary tool modules can include the flow view editor, action view editor, and source editor.

Figure 6:
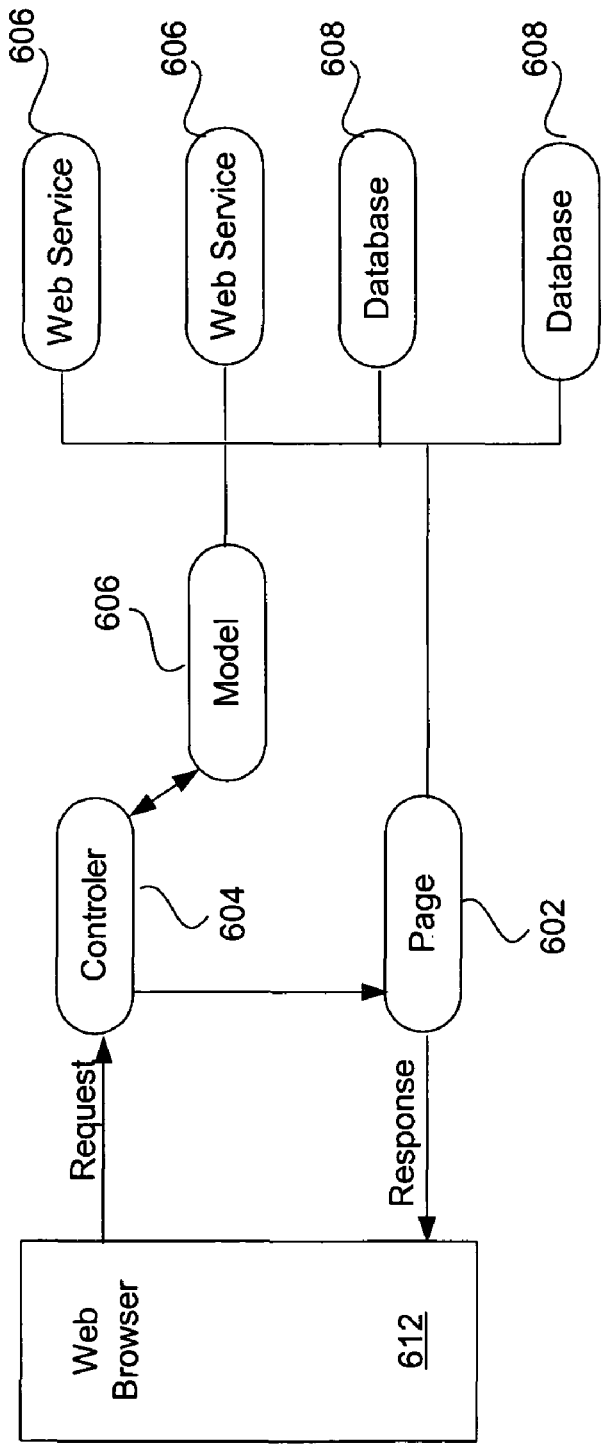
FIG. 6 is an illustration of an exemplary system in an embodiment.

FIG. 6 is an illustration of an exemplary system in an embodiment. In one embodiment, controller 604 accepts a communication (e.g. an HTTP request) from browser 612. In one embodiment, the controller can be servlet. The controller accepts the request and determines which page 602 (e.g., JSP) to redirect or forward the request to based on a consultation with model 600. In one embodiment, the model can be implemented as one or more JavaBeans. The model contains the business logic of the application. The controller then transfers control to this page. The page flow model and the current page can interact with one or web services 606 and one or more databases 608 to perform business logic and other tasks.

Page groups can be used to maintain application state. The system takes care of managing data and providing access to state variables in a page group through annotated variables declared in the page group. Page group variables can be annotated to be scoped to the request, session, or page group life. If a particular variable is not annotated with any scope then its scope will be that of the containing page group's lifetime. In the case of nested page groups, any page group scoped state will exist until that page group is no longer needed by the flow infrastructure (when flow has left one page group for another page group and won't be coming back as a result of nesting unwinding).

A page flow is a Java class that controls the behavior of a web application through the use of specially designed annotations and methods. The directory that contains the page flow class also includes the JavaServer Pages (JSPs) used in the page flow. For a JSP to be considered part of a page flow, it can reside within the page flow directory. The JSP files use special tags which help bind to data and business logic actions. The actions in the JSP correspond to action methods that are defined in the page flow. These actions methods implement code that can result in site navigation, passing data, or invoking back-end business logic via controls. Significantly, the business logic in the page flow class is separate from the presentation code defined in the JSP files.

Figure 7:
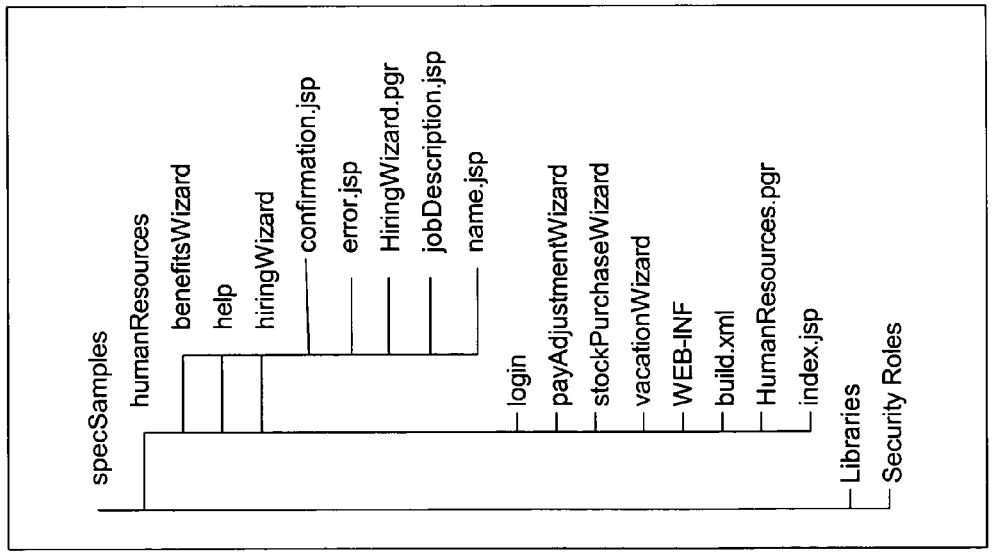
FIG. 7 is an illustration of an exemplary page group directory hierarchy in an embodiment.

In one embodiment, a page group is a set of related and interacting web application files. The set of files in a page group includes *.jsp files and a Java controller class definition file that is specially named with a .pgr extension. By way of a non-limiting example, the set of files for a hiring wizard page group could be arranged in a web application hiringWizard file directory as illustrated in FIG. 7.

The term page group can be used in two ways. It can be used to refer to the directory and all of the files in a directory that make up a page group. It can also be used in a shorthand way to refer to the controller class defined in a page group's*.pgr file. By way of a non-limiting example, in the hiring wizard page group shown above, the term page group could be used to refer to the hiringWizard directory and all five of the files contained in that directory, and the term could also be used to refer to just the HiringWizard controller class that is defined in the HiringWizard.pgr file. References to a page group's directory and files will be made in lower case and references to a page group's controller class will be made in upper case. By way of a non-limiting example, hiringWizard refers to a directory and a set of files, whereas HiringWizard refers to a Java class.

Page groups enable developers to simplify the file and code organization of web applications. Developers may use page groups to organize the files of a web application into small, focused units. By way of a non-limiting example, a developer might organize the files of the human resources portion of a large web application into benefitsWizard, help, hiringWizard, login, payAjustment Wizard, stockPurchaseWizard and vacationWizard page groups as shown in FIG. 7. Developers may use page groups to remove code from *.jsp files and centralize the code into*.pgr files. By way of a non-limiting example, a developer might centralize into the HiringWizard-.pgr file the navigation code that otherwise would have been spread out among the hiring wizard's name.jsp, jobDescription.jsp, error.jsp and confirmation.jsp files.

Page groups can enable web application developers to implement powerful functionality with minimal effort. Developers may use instances of page group classes to hold and maintain information that is gathered from web site users at system. By way of a non-limiting example, a developer could use an instance of the HiringWizard class to hold and maintain the name and job description information that would be gathered from users of the hiringWizard pages. Developers may use page groups to dynamically nest web site functionality within other web site functionality. By way of a non-limiting example, a developer could place Help buttons in the hiringWizard pages. When a hiring wizard user requests help by pressing one of the Help buttons, the system would dynamically nest a help page group within the hiringWizard page group and navigate the user to the pages of the help page group. When the user presses an OK button in the help pages to indicate that they have completed their reading of the help pages, the system would un-nest the help page group and navigate the user back to their original location in the hiring-Wizard page group. Also, the system would restore all of the user's HiringWizard state so that the user would return to the hiringWizard in exactly the same condition that they had left it when they pressed the Help button.

Page groups can be the main part of a web application programming model that enables architects and developers to design and implement web apps using an easy-to-understand, easy-to-maintain, fill-in-the-blanks pattern. Architects may use page groups to design the overall structure of web applications and to create a fill-in-the-blanks skeletal version of web applications. By way of a non-limiting example, architects may create skeletal page group classes that define only the basic relationships among page group files and that contain only method signatures and no method bodies. Developers may then fill in the blank method bodies of the page group classes to complete the implementation of web apps. By way of a non-limiting example, developers may fill in page group class method bodies to accomplish such detailed tasks as flowing data from one page to another page.

In one embodiment, Page groups can interoperate with Struts code. The page group programming model offers the following advantages over the Struts programming model:

Thread safe. Instances of page group classes are accessed by the system in a single-threaded manner whereas instances of Struts action classes are accessed by the Struts framework in a multi-threaded manner. Unlike Struts developers, page group developers do not have to worry about threading issues when programming page group classes.

Elimination of multi-session use of instance members and action code. Instances of page group classes are dedicated to individual user sessions whereas instances of Struts action classes are shared across user sessions. Developers of page groups are guaranteed that a page group class's instance members and action code are not accessed by multiple sessions.

Statefulness. An instance of a page group class is kept alive on a per-user-session basis so long as a user is navigating within the scope of the respective page group, and is destroyed upon user exit from the respective page group. Unlike Struts action class developers, page group class developers may use instance members in page group classes to hold user session state.

Type strength. Instances of page group classes may contain instance members of arbitrary types, such as Customer or ShoppingCart, unlike Struts action classes which may not contain instance members and instead can depend upon type-less use of the Request and Session objects. Developers of page group classes will benefit from Workshop IDE features such as statement auto-completion that leverage the type strength of page group class instance members.

Useful constructors. Instances of page group classes are constructed upon entry into page groups and destroyed upon exit from page groups whereas instances of Struts action classes are constructed upon first use and are re-used thereafter. Developers of page groups are guaranteed that page group class constructors will be called upon entry to page groups, and that there will be only one entry to a page group per page group class constructor call. Therefore, developers of page groups may implement useful page group class constructors that perform such tasks as per-session page group initialization.

Better action method signatures. The system performs such tasks as casting action form arguments from the generic Struts ActionForm type to the more specific form type expected by the developers of the action methods. By way of a non-limiting example, the system would automatically cast an argument from the generic org.apache.struts.action.ActionForm type to a more specific corn.acme.humanResources.Name Form type. This casting would relieve the action method programmer of the burden of performing the type cast.

Elimination of need to make configuration file entries. Page group classes are annotated Java classes. The annotations that are made in page group classes define such things as pages that maybe forwarded to by action methods. Developers of page group classes may use annotations to conveniently define in one place all of the relationships among the files of a page group, unlike developers of Struts applications who can write code in action class files and make entries in configuration files.

In one embodiment, page group controller classes can be defined in files that are specially named with an extension of .pgr. The .pgr extension is used to indicate to an integrated development environment (IDE) that the files are page group controller class definition files. The IDE can give special treatment such as two-way editing support to page group controller class definition files. The .pgr extension is also used to indicate to the system that the files are page group controller class definition files. The system can give special compilation and request dispatch treatment to controller class definition files.

Annotations are provided for use in page group controller classes to declare important page group properties. Page group properties are used by the IDE to present graphical views of page groups. Page group properties are also used to indicate to the page group compiler information that the compiler needs to properly configure a page group for use. By way of a non-limiting example, a @pgr:action annotation is used to indicate to the page group compiler that it should make the corresponding page group method available for request by users of browser pages.

There are several annotations available for use in page groups. Most of the annotations are described in the non-limiting examples in that follow. All of the annotations are fully defined in the reference section of this specification.

All page group classes can be derived from a common class, e.g. com.bea.wlw.netui.pagegroup.PageGroup. By way of a non-limiting example, a HiringWizard page group class could be defined as:

```
package hiringWizard;
import com.bea.wlw.netui.pagegroup.PageGroup;
public class HiringWizard extends PageGroup
{
    . . .
}
```

Page group classes contain user interface control logic. User interface control logic is logic that implements navigation decisions, that flows data into and out of pages and that invokes back-end business logic via calls to business controls. User interface control logic is implemented in page group classes within action methods. Action methods are methods that are annotated with @pgr:action and that have signatures that look like the namePage_next method of the following code:

```
package hiringWizard;
import com.bea.wlw.netui.pagegroup.PageGroup;
import com.bea.wlw.netui.pagegroup.Forward;
public class HiringWizard extends PageGroup
{
    /**
     * @pgr:action
     */
    public Forward namePage__next( )
    {
        ...
    }
}
```

In one embodiment and as shown by the code example above, action methods can return objects of type com.bea.wl-w.netui.pagegroup. Forward. An example of the action method namePage_next returning a Forward object:

```
package hiringWizard;
import com.bea.wlw.netui.pagegroup.PageGroup;
import com.bea.wlw.netui.pagegroup.Forward;
public class HiringWizard extends PageGroup
{
    /**
     * @pgr:action
     * @pgr:forward name="getJobDesc"
       path="jobDescription.jsp"
     */
    public Forward namePage__next( )
    {
        ...
        return new Forward("getJobDesc");
    }
}
```

A Forward object is returned by an action method to indicate to the system that the action method wants the system to navigate to the location described by the Forward object. In the example, the Forward object encapsulates the navigation information needed by the system to navigate to the page jobDescription.jsp. The Forward object can be constructed by passing the string "getJobDesc" to the Forward constructor. This indicates to the Forward object that it should encapsulate the information provided in the @pgr:forward annotation that has a name attribute of "getJobDesc."

An action method may receive a form argument that encapsulates the data that was posted to the action method's page group by a browser user. By way of a non-limiting example, the name Page_next action method may receive an argument form that is of type NameForm:

```
package hiringWizard;
import com.bea.wlw.netui.pagegroup.PageGroup;
import com.bea.wlw.netui.pagegroup.Forward;
public class HiringWizard extends PageGroup
```

-continued

```
{
    /**
     * @pgr:action
     * @pgr:forward name="getJobDesc"
       path="jobDescription.jsp"
     */
    public Forward namePage__next(NameForm form)
    {
        ...
        return new Forward("getJobDesc");
    }
}
```

Figure 8:
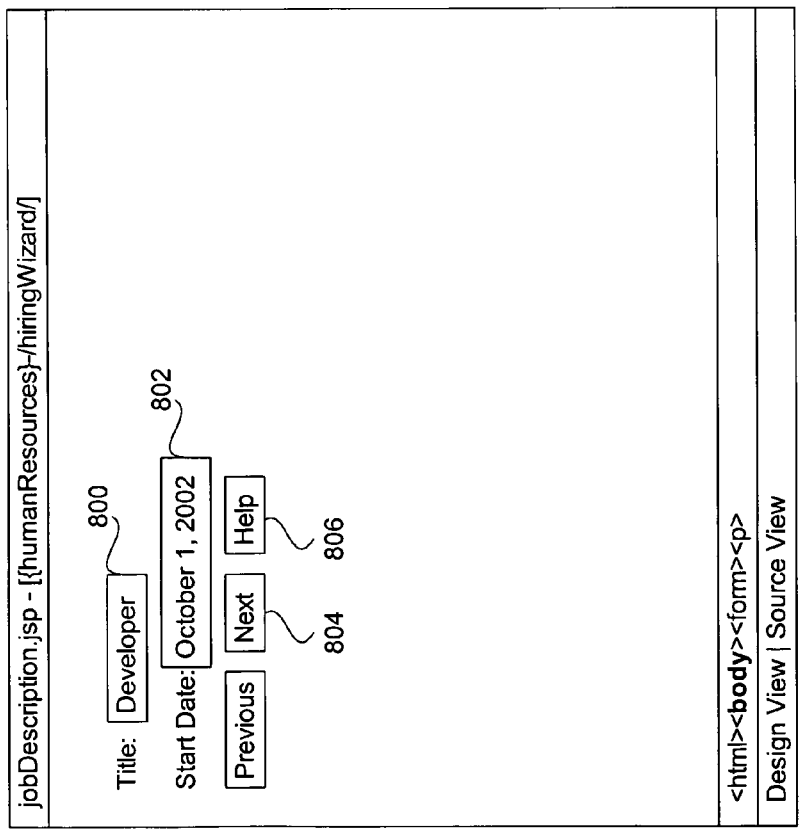
FIG. 8 is an exemplary form rendered in an embodiment.

FIG. 8 is an exemplary form rendered in a web browser in an embodiment. The form argument would encapsulate information such as first name and last name that was received from the browser user who filled out the fields (800 and 802) of the name.jsp page and pressed the name.jsp'sNext button 804.

A form class may be defined in its own .java file, or may instead be defined as an inner class within a page group class. By way of a non-limiting example, the NameForm class maybe defined with the HiringWizard class as follows:

```
package hiringWizard;
import com.bea.wlw.netui.pagegroup.PageGroup;
import com.bea.wlw.netui.pagegroup.Forward;
import com.bea.wlw.netui.pagegroup.Form;
public class HiringWizard extends PageGroup
{
    /**
     * @pgr:action
     * @pgr:forward name="getJobDesc"
       path="jobDescription.jsp"
     */
    public Forward namePage__next(NameForm form)
    {
        ...
        return new Forward("getJobDesc");
    }
    public static class NameForm extends Form
    {
        protected String firstName;
        protected String lastName;
        public String getFirstName( )
        {
            return firstName;
        }
        public void setFirstName(String firstName)
        {
            this.firstName = firstName;
        }
        public String getLastName( )
        {
            return lastName;
        }
        public void setLastName(String lastName)
        {
            this.lastName = lastName;
        }
    }
}
```

The system keeps an instance of a page group class alive for a browser user for the duration of time that the user is viewing pages within that page group. Because of this, a page group class can contain instance members that hold some of a user's session information, and an action method can copy user information from its form argument to the instance members. By way of a non-limiting example, the namePage_next action method can copy first name and last name information from the properties of the form argument to firstName and lastName instance members:

```
package hiringWizard;
import com.bea.wlw.netui.pagegroup.PageGroup;
import com.bea.wlw.netui.pagegroup.Forward;
import com.bea.wlw.netui.pagegroup.Form;
public class HiringWizard extends PageGroup
{
    protected String firstName;
    protected String lastName;
    /**
     * @pgr:action
     * @pgr:forward name="getJobDesc"
     path="jobDescription.jsp"
     */
    public Forward namePage__next(NameForm form)
    {
        firstName = form.getFirstName( );
        lastName = form.getLastName( );
        return new Forward("getJobDesc");
    }
    ...
}
```

Pages of page groups can be used to display data to users and to collect data from users. In order for a page to bind to data, data can be made available to that page before forwarding to that page. Therefore, an action method can make data available to the page indicated by the Forward object returned by that action method. By way of a non-limiting example, the action method namePage_next can make data such as a default start date (e.g. two weeks from today) available to the job description page indicated by the "getJobDesc" Forward object. The most common way that action methods will make data available to pages is via Form-derived objects. By way of a non-limiting example, the namePage_next action method could make data such as the default start date available to the job description page by passing an instance of the JobDescriptionForm class to the job description page via the constructor of the "getJobDesc" Forward object:

```
package hiringWizard;
import java.util.Date;
import com.bea.wlw.netui.pagegroup.PageGroup;
import com.bea.wlw.netui.pagegroup.Forward;
import com.bea.wlw.netui.pagegroup.Form;
public class HiringWizard extends PageGroup
{
    protected String firstName;
    protected String lastName;
    /**
     * @pgr:action
     * @pgr:forward name="getJobDesc"
     path="jobDescription.jsp"
     */
    public Forward namePage__next(NameForm form)
    {
        firstName = form.getFirstName( );
        lastName = form.getLastName( );
        JobDescriptionForm jobDescForm = new
        JobDescriptionForm( );
        return new Forward("getJobDesc", jobDescForm);
    }
    ...
    public static class JobDescriptionForm extends Form
    {
        protected String title = "";
        protected Date startDate = getDefaultStartDate( );
        public String getTitle( )
        {
```

-continued

```
            return title;
        }
        public void setTitle(String title)
        {
            this.title = title;
        }
        public Date getStartDate( )
        {
            return startDate;
        }
        public void setStartDate(Date startDate)
        {
            this.startDate = startDate;
        }
        protected Date getDefaultStartDate( )
        {
            ...
        }
    }
}
```

In one embodiment, a set of JSP tags can be used by page developers to bind pages to web application data sources. The jobDescription.jsp page of the hiringWizard page group could use these tags, By way of a non-limiting example, to bind to the data of the JobDescriptionForm (see FIG. 8) provided to the page by the namePage_next action method. By way of a non-limiting example, the jobDescription.jsp page could use data-bound tags such as the <netui-tags-html: textbox> tag to bind to the title and startDate properties of the JobDescriptionForm object. (See FIG. 9.)

As described earlier, because an instance of a page group class can be maintained for the duration of time that a user is navigating within the pages of the page group class's group, an instance of a page group class is a convenient place to accumulate and reuse information gathered from a user. By way of a non-limiting example, after a user has navigated through the name.jsp page to the jobDescription.jsp page, a user might want to push a Previous button to go back to the name.jsp page to correct the First Name or Last Name fields. The first name and last name that had been collected from the user when the user first submitted the name.jsp page could be made available to the name.jsp page again for binding and re-display to the user:

```
package hiringWizard;
import java.util.Date;
import com.bea.wlw.netui.pagegroup.PageGroup;
import com.bea.wlw.netui.pagegroup.Forward;
import com.bea.wlw.netui.pagegroup.Form;
public class HiringWizard extends PageGroup
{
    protected String firstName;
    protected String lastName;
    protected String title;
    protected Date startDate;
    /**
     * @pgr:action
     * @pgr:forward name="getJobDesc"
     path="jobDescription.jsp"
     */
    public Forward namePage__next(NameForm form)
    {
        firstName = form.getFirstName( );
        lastName = form.getLastName( );
        JobDescriptionForm jobDescForm = new
        JobDescriptionForm( );
```

-continued

```
            return new Forward("getJobDesc", jobDescForm);
        }
    /**
     * @pgr:action
     * @pgr:forward name="getName" path="name.jsp"
     */
    public Forward jobDescPage__previous(JobDescriptionForm
    form)
        {
            title = form.getTitle( );
            startDate = form.getStartDate( );
            NameForm nameForm = new NameForm( );
            nameForm.setFirstName(firstName);
            nameForm.setLastName(lastName);
            return new Forward("getName", nameForm);
        }
    }
```

Just as an instance of a page group can be used to accumulate information to enable backwards navigation flow through some pages, the instance can be used to accumulate information to enable the presentation of a summary/confirmation page:

```
    /**
     * @pgr:action
     * @pgr:forward name="getConfirm" path="confirmation.jsp"
     */
    public Forward jobDescPage__next(JobDescriptionForm form)
        {
            title = form.getTitle( );
            startDate = form.getStartDate( );
            HireForm hireForm = new HireForm( );
            hireForm.setFirstName(firstName);
            hireForm.setLastName(lastName);
            hireForm.setTitle(title);
            hireForm.setStartDate(startDate);
            return new Forward("getConfirm", hireForm);
        }
    public static class HireForm extends Form
        {
            protected String firstName;
            protected String lastName;
            protected String title;
            protected Date startDate;
            public String getFirstName( )
            {
                return firstName;
            }
            public void setFirstName(String firstName)
            {
                this.firstName = firstName;
            }
            public String getLastName( )
            {
                return lastName;
            }
            public void setLastName(String lastName)
            {
                this.lastName = lastName;
            }
            public String getTitle( )
            {
                return title;
            }
            public void setTitle(String title)
            {
                this.title = title;
            }
            public Date getStartDate( )
            {
                return startDate;
            }
            public void setStartDate(Date startDate)
```

-continued

```
            {
                this.startDate = startDate;
            }
        }
    }
```

A principal benefit of page group classes is that they provide a central location for placement of code that interacts with back-end business logic. In web applications, interactions with back-end business logic can be performed via business controls. Code that interacts with business logic would typically be placed in action methods. By way of a non-limiting example, the code to initiate a workflow to hire a new employee could be placed in an action method called confirmationPage_hire:

```
    /**
     * @pgr:action
     * @pgr:forward name="readyForNextCandidate"
     path="name.jsp"
     */
    public Forward confirmationPage__hire(HireForm form)
        {
            hiringService.hire(form.getFirstName( ),
                               form.getLastName( ),
                               form.getTitle( ),
                               form.getStartDate( ));
            firstName = null;
            lastName = null;
            title = null;
            startDate = null;
            NameForm nameForm = new NameForm( );
            return new Forward("readyForNextCandidate", nameForm);
        }
```

The confirmationPage_hire action method initiates a hiring workflow by calling the hire method of the HiringService control. The action method makes the call to the hire method with the firstName, lastName, jobDescription and startDate properties of the HireForm argument that it received from the confirmation.jsp page. If the user filled out the forms of the name.jsp and jobDescription.jsp pages correctly, then the properties of the HireForm argument should be good enough to successfully initiate the hiring workflow. However, if the user did not correctly fill out either or both of the name.jsp and jobDescription.jsp forms, then the HiringService will reject the attempt to initiate a workflow.

The page group framework provides support that makes it easy to re-show error-containing pages immediately after they have been submitted. The page re-show support is based upon a form validation model. The form validation model is based upon the request processing cycle. Every browser request that is received by the system is processed through several steps.

The system performs the first step in the cycle by using the name-value pairs in the request to make property assignments to an instance of the appropriate Form class for that request. By way of a non-limiting example, if a user presses the Next button on the name.jsp page, the browser submits a request to the system. In response, the system creates an instance of the NameForm class and uses the firstName="John" and lastName="Doe" name-value pairs in the request to assign "John" and "Doe" to the instance's firstName and lastName properties.

In one embodiment, the system performs the next step in the cycle by calling the Form instance's validate method. The validate method validates the properties of the Form instance, and returns an instance of an Errors collection object if the validate method finds any validation errors. In one embodiment, all Form-derived classes inherit an empty implementation of validate from the base Form class. The empty implementation never reports errors and always returns an empty Errors collection. All Form-derived classes are free to override the validate method to implement their own validation behavior. By way of a non-limiting example, the NameForm class could override the validate method as follows:

```
public static class NameForm extends Form
{
    protected String firstName = "";
    protected String lastName = "";
    ...
    public Errors validate( )
    {
        Errors errors = new Errors( );
        if(firstName == null)
        {
            errors.add(new Error("firstName is required"));
        }
        if(lastName == null)
        {
            errors.add(new Error("lastName is required"));
        }
        return errors;
    }
}
```

In this case, if the browser request from name.jsp does not contain both firstName and lastName name-value pairs, then the NameForm instance will not pass validation and will return an Errors collection that contains Error objects for each of the missing properties.

When the system calls a Form instance's validate method and receives a non-empty Errors collection, then the system short-circuits the normal request processing cycle. Instead of calling an action method in a page group to process the request, the system forwards to the page that submitted the bad request so that the page may be re-shown to the user with error messages. By way of a non-limiting example, if the user filled out the name.jsp page's First Name field but did not fill out the Last Name field prior to pressing the Next button, the NameForm instance would fail validation and the system would automatically re-show the name.jsp page to the user with an error message explaining that the Last Name field is required.

The system provides a declarative alternative to the validate method technique described above. Instead of (or in addition to) implementing a validate method, it is possible to annotate Form classes to express the validation checks that would have been encoded in the validate method. By way of a non-limiting example, the NameForm class could be annotated as follows:

```
/**
 * @pgr:validation    property="firstName"
 *                    required="true"
 *                    pattern="TBD"
 * @pgr:validation    property="lastName"
 *                    required="true"
 *                    pattern="TBD"
 */
public static class NameForm extends Form
{
    protected String firstName = "";
    protected String lastName = "";
    ...
}
```

The page group compiler will generate validation code for each of the validation checks described with @pgr:validation annotations. The system will execute the validation code after calling the validate method, and will add any Error objects to the same Errors collection object that is returned by the validate method.

Like most Java code, code in page group controller classes may have to catch and handle exceptions. In regular Java code, exceptions would be caught and handled by catch clauses within method bodies. Page group action methods may be written to use the same type of catch clauses. By way of a non-limiting example, to catch and handle exceptions thrown by the workflow business control, a catch clause could be added to the confirmationPage_hire action method:

```
/**
 * @pgr:action
 * @pgr:forward name="readyForNextCandidate"
path="name.jsp"
 * @pgr:forward name="error" path="error.jsp"
 */
public Forward confirmationPage_hire(HireForm form)
{
    try
    {
        hiringService.hire(firstName, lastName, title,
            startDate);
    }
    catch(Exception e)
    {
        // TODO: Add code to handle exception
        return new Forward("error");
    }
    firstName = null;
    lastName = null;
    title = null;
    startDate = null;
    NameForm nameForm = new NameForm( );
    return new Forward("readyForNextCandidate", nameForm);
}
```

To improve the quality of an IDEs view of application flow and because many corporate developers are unfamiliar with try/catch programming and are instead familiar with onError programming, the system supports an alternative model for catching exceptions. The confirmationPage_hire action method can be annotated with @pgr:catch, and the method signature can be extended to include a throws clause. Because of the changes to the action method, the system will catch all exceptions thrown by the method and will forward to the error.jsp page that is identified in the path attribute of the @pgr:catch annotation. Also in the example above, because the system catches the exceptions thrown by the confirmationPage_hire method, the HiringWizard page group does not get an opportunity to handle the exceptions.

```
/**
 * @pgr:action
 * @pgr:forward name="readyForNextCandidate"
path="name.jsp"
 * @pgr:catch type="com.acme.WorkflowException"
```

```
    path="error.jsp"
    */
    public Forward confirmationPage_hire(HireForm form)
    throws Exception
    {
        hiringService.hire(firstName, lastName, title,
        startDate);
        firstName = null;
        lastName = null;
        title = null;
        startDate = null;
        NameForm nameForm = new NameForm( );
        return new Forward("readyForNextCandidate", nameForm);
    }
```

The system provides yet another alternative for catching and handling exceptions:

```
    /**
    * @pgr:exceptionHandler
    * @pgr:forward name="error" path="error.jsp"
    */
    protected Forward onError(Exception e,
                              String errorMethodName,
                              String messageKey,
                              String message,
                              Form form)
    {
        // TODO: Add some code to handle error
        return new Forward("error");
    }
```

Nesting is a feature that enables web sites to support such things as user navigation from a location in a first page group to a location in a second page group and back to the first page group. Nesting enables web sites to support user navigation from a location in a nesting page group to a location in a nested page group and back to the nesting page group. By way of a non-limiting example, the nesting feature enables user navigation from the hiringWizard's jobDescription.jsp page to a page in the help page group and back to the jobDescription.jsp page, with all of the user's jobDescription.jsp information such as Job Description and Start Date intact.

In one embodiment, nesting occurs when an action method in a nesting page group returns a Forward object that refers to another page group that is nestable. As described earlier, the system keeps a page group instance alive for the duration of time that a user is navigating within the pages of that page group. By way of a non-limiting example, the system would keep an instance of the HiringWizard page group alive while a user was navigating through the name.jsp, jobDescription.jsp and confirmation.jsp pages. By keeping a page group instance alive, the system keeps alive user state such as the HiringWizard instance's firstName and title that is gathered by the pages of that page group. The system only disposes of a page group instance and that page group instance's user state when a user navigates out of the page group.

When a page group nests a second page group, the nesting page group instance is kept alive while the user is navigating the pages of the nested page group. Upon user return to the nesting page group the nested page group instance is disposed.

By way of a non-limiting example, if from within the hiringWizard page group a user pressed a Help button to cause nesting of the help page group, the user would then be in the help page group. Upon return to the hiringWizard page group, the user would no longer be in the help page group, and would only be in the hiringWizard page group.

In one embodiment, the system can keep page group instances alive by keeping them on a session-based page group stack. Whenever a user enters a page group, the system can push the page group instance onto the stack. When the user exits the page group, the system can pop the page group instance off of the stack.

By way of a non-limiting example, if a user entered the hiringWizard page group, the system would push the HiringWizard page group instance onto the stack. If the user then pressed a Help button to cause the help page group to be nested, then the system would push the Help page group instance onto the top of the page group stack. Upon return from the nested help page group to the hiringWizard page group, the system would pop the Help page group instance from the page group stack.

In one embodiment, there are at least three web site scenarios that are supported by the nesting feature. The first scenario is the one already mentioned: a web site can support user navigation from a location in the web site, to a second location in the web site and then back to the first location in the web site with all first-location state intact. The second scenario is one in which the developers of a site use a page group in the same way that they use a page. In this scenario, the nested page group may be viewed as participating in the flow of the nesting page group. An example of this scenario is the case where the developers of the hiringWizard page group replace the name.jsp page with an employeeInfoWizard page group that uses a sequence of pages to collect not only the name, but also things like address, telephone number and email address. The third scenario is one in which a page group can support interruption of a web flow to ensure that some important preconditions are met before continuing the web flow. An example of this scenario is the case where in the middle of some web flow the page group logic determines that a user login can occur, so the logic diverts to some login pages and upon completion of the login returns to complete the interrupted web flow.

Figure 10:
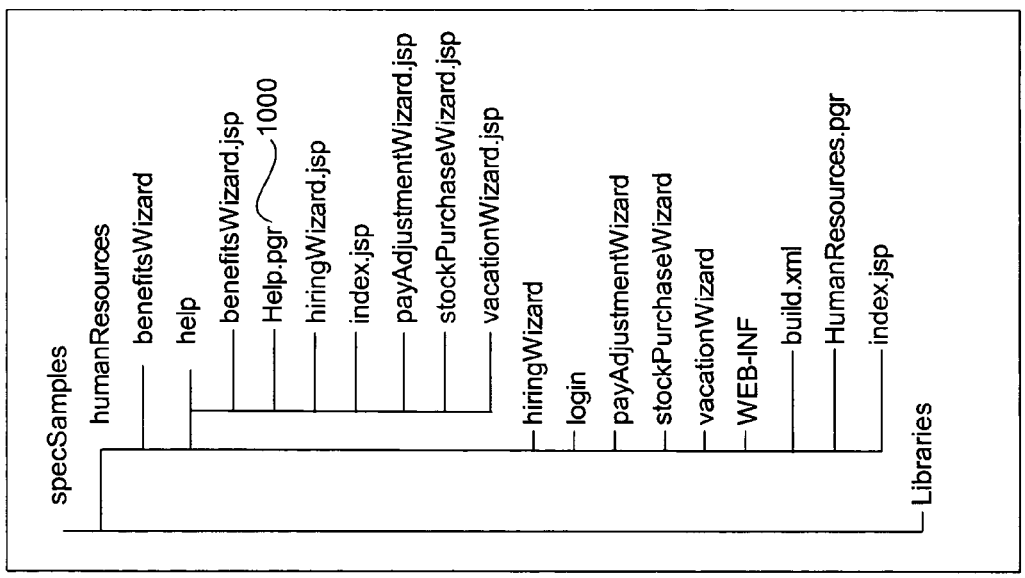
FIG. 10 is an illustration of an exemplary page group directory hierarchy in an embodiment.

By way of a non-limiting example of the web site scenario where a web site can support user navigation from a location in the web site, to a second location in the web site and then back to the first location in the web site with all first-location state intact. In this example, the humanResources web application contains a help page group 1000 (See FIG. 10).

While navigating through the pages of the hiringWizard page group, a user might request help by pressing the Help 806 button on the jobDescription.jsp page (see FIG. 8). Pressing the Help button on the jobDescription.jsp page could cause the execution of a jobDescriptionPage_help action method in the HiringWizard page group class:

```
    /**
    * @pgr:action
    * @pgr:forward name="getHelp" path="/help/Help.pgr"
    */
    public Forward jobDescriptionPage_help( )
    {
        return new Forward("getHelp");
    }
```

The jobDescriptionPage_help action method forwards to the help page group. Note that the path attribute of the jobDescriptionPage_help method's @pgr:forward annotation refers to the path/help/Help.pgr. This path is special in two ways. First, it begins with a forward slash. This indicates to the system that the path should not be interpreted in the default page group relative fashion and instead should be interpreted relative to the web application root. Second, the path ends with a .pgr extension and refers to a page group class definition file instead of to a page file.

Like the HiringWizard page group, the Help page group can be defined as an annotated Java class:

```
package help;
import com.bea.wlw.netui.pagegroup.PageGroup;
public class Help extends PageGroup
{
    ...
}
```

Unlike the HiringWizard page group, the Help page group can be specially annotated to indicate that it should be nested whenever it is used:

```
package help;
import com.bea.wlw.netui.pagegroup.PageGroup;
/**
 * @pgr:nestable
 */
public class Help extends PageGroup
{
    ...
}
```

When the system forwards to the Help page group, the system pushes the Help page group instance onto the page group stack. Then the system will look for, select and execute the Help page group's action method that is specially marked with the @pgr:begin annotation:

```
package help;
import com.bea.wlw.netui.pagegroup.PageGroup;
import com.bea.wlw.netui.pagegroup.Forward;
/**
 * @pgr:nestable
 */
public class Help extends PageGroup
{
    /**
     * @pgr:begin
     */
    public Forward begin( )
    {
        ...
    }
}
```

Although not shown in the previous examples, all page group controller classes can contain begin methods. And the begin methods of page group controller classes are always executed by the system upon entry to a page group. The begin action method of the Help page group could return a forward object that represents the default page of the Help page group:

```
package help;
import com.bea.wlw.netui.pagegroup.PageGroup;
import com.bea.wlw.netui.pagegroup.Forward;
/**
 * @pgr:nestable
 */
```

-continued

```
public class Help extends PageGroup
{
    /**
     * @pgr:begin
     * @pgr:forward name="defaultPage" path="index.jsp"
     */
    public Forward begin( )
    {
        return new Forward("defaultPage");
    }
}
```

Figure 11:
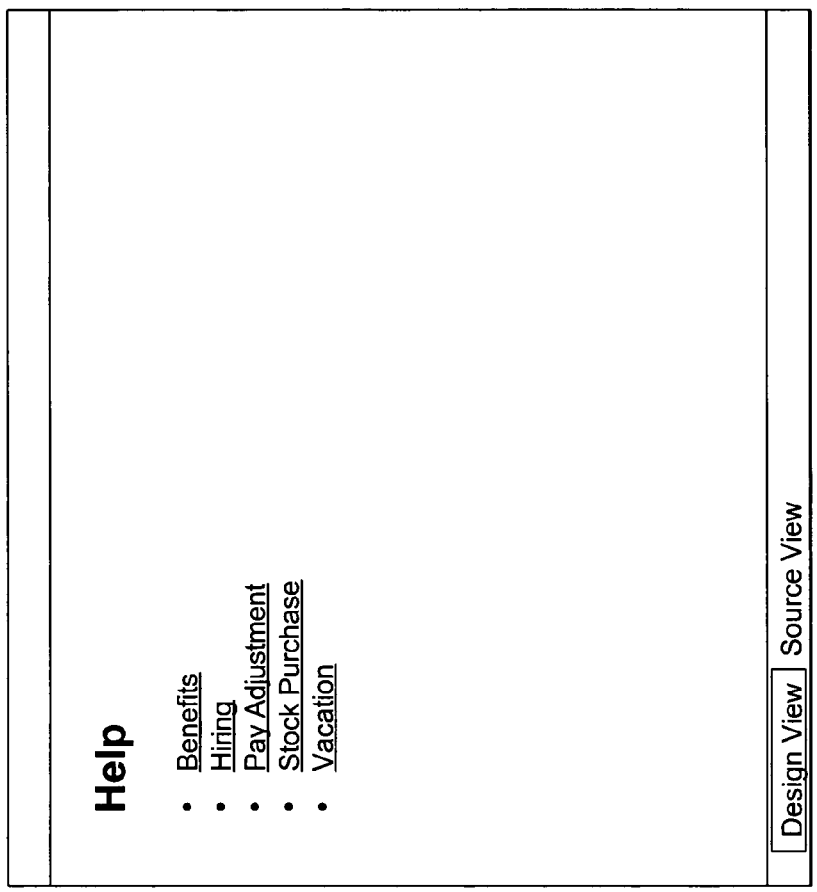
FIG. 11 is an exemplary help page rendered in an embodiment.

The default page (index.jsp) is illustrated in FIG. 11. As can be seen, the help page group's default page is just that. It includes a table of contents for the help page group, and merely enables a web site user to select a help topic. However, for the example of a user that pressed a Help button on the jobDescription.jsp page of the hiringWizard page group, there shouldn't be a need for a user to have to select a help topic from a table of contents. Instead, since the help context (hiringWizard page group) is already known, the help page group should be directed to automatically forward to the relevant help page. To enable nesting page groups such as HiringWizard to select help contexts, the Help page group can make something like a HelpContextForm class available that provides help context ids and a contextId property:

```
package help;
import com.bea.wlw.netui.pagegroup.PageGroup;
import com.bea.wlw.netui.pagegroup.Forward;
/**
 * @pgr:nestable
 */
public class Help extends PageGroup
{
    /**
     * @pgr:begin
     * @pgr:forward name="defaultPage" path="index.jsp"
     */
    public Forward begin( )
    {
        return new Forward("defaultPage");
    }
    public static class HelpContextForm extends Form
    {
        public static final int BENEFITS = 0;
        public static final int HIRING_WIZARD = 1;
        public static final int PAY_ADJUSTMENT_WIZARD = 2;
        public static final int STOCK_PURCHASE_WIZARD = 3;
        public static final int VACATION_WIZARD = 4;
        protected int helpContextId;
        public int getHelpContextId( )
        {
            return helpContextId;
        }
        public void setHelpContextId(int helpContextId)
        {
            this.helpContextId = helpContextId;
        }
    }
}
```

Given the availability of the HelpContextForm class, the jobDescriptionPage_help action method could then be modified to pass help context information to the Help page group via the Forward:

```
/**
 * @pgr:action
 * @pgr:forward name="getHelp" path="/help/Help.pgr"
 */
public Forward jobDescriptionPage_help( )
{
    Help.HelpContextForm helpForm = new
    Help.HelpContextForm( );
    helpForm.setHelpContextId(Help.HelpContextForm.HIRING_
    WIZARD);
    return new Forward("getHelp", helpForm);
}
```

With the jobDescriptionPage_help action method passing the HelpContextForm object, the begin action method of the Help page group could be modified to select the help page that makes the most sense:

```
package help;
import com.bea.wlw.netui.pagegroup.PageGroup;
import com.bea.wlw.netui.pagegroup.Forward;
/**
 * @pgr:nestable
 */
public class Help extends PageGroup
{
    /**
     * @pgr:begin
     * @pgr:forward name="defaultPage" path="index.jsp"
     * @pgr:forward name="benefitsHelp" path="benefits.jsp"
     * @pgr:forward name="hiringHelp" path="hiringWizard.jsp"
     * @pgr:forward name="payAdjustHelp"
     path="payAdjustWizard.jsp"
     * @pgr:forward name="stockPurchHelp"
     path="stockPurchWizard.jsp"
     * @pgr:forward name="vacationHelp"
     path="vacationWizard.jsp"
     */
    public Forward begin(HelpContextForm form)
    {
        switch(form.getHelpContextId( ))
        {
            case HelpContextForm.BENEFITS:
                return new Forward("benefitsHelp");
            case HelpContextForm.HIRING_WIZARD:
                return new Forward("hiringHelp");
            case HelpContextForm.PAY_ADJUSTMENT_WIZARD:
                return new Forward("payAdjustHelp");
            case HelpContextForm.STOCK_PURCHASE_WIZARD:
                return new Forward("stockPurchHelp");
            case HelpContextForm.VACATION_WIZARD:
                return new Forward("vacationHelp");
            default:
                return new Forward("defaultPage");
        }
    }
    public static class HelpContextForm extends Form
    {
        public static final int BENEFITS = 0;
        public static final int HIRING_WIZARD = 1;
        public static final int PAY_ADJUSTMENT_WIZARD = 2;
        public static final int STOCK_PURCHASE_WIZARD = 3;
        public static final int VACATION_WIZARD = 4;
        protected int helpContextId;
        public int getHelpContextId( )
        {
            return helpContextId;
        }
        public void setHelpContextId(int helpContextId)
        {
            this.helpContextId = helpContextId;
        }
    }
}
```

The hiringWizard.jsp page can contain a Done button. When the user presses the Done button, the Help page group's hiringHelpPage_done action method is invoked. Like all action methods, the hiringHelpPage_done action method returns a Forward object. Unlike most action methods, however, the hiringHelpPage_done action method returns a Forward object that encapsulates a @pgr:forward annotation that does not have a path attribute:

```
/**
 * @pgr:action
 * @pgr:forward name="done" returnAction="help_done"
 */
public Forward hiringHelpPage_done( )
{
    return new Forward("done");
}
```

The hiringHelpPage_done action method returns a Forward object that encapsulates a @pgr:forward annotation that has a returnAction attribute. The presence of this attribute changes the meaning of the @pgr:forward annotation significantly. Because of this attribute, the annotation describes a return from the nested Help page group to the nesting HiringWizard page group. In short, the hiringHelpPage_done action method returns a Forward object that causes a return from the nested Help page group to the nesting HiringWizard page group.

The system responds to the Forward object by popping the nested Help page group instance off of the page group stack, which leaves the nesting HiringWizard page group instance as the only instance on the page group stack. Then, per the returnAction="help_done" attribute of the Help page group, the system executes the help_done action method in the HiringWizard page group:

```
/**
 * @pgr:action
 */
public Forward help_done( )
{
    ...
}
```

The help_done causes a return to the original page, jobDescription.jsp, by returning a Forward object that encapsulates a @pgr:forward annotation that describes a return to the original page. The @pgr:forward annotation describes a return to the original page because instead of having a path attribute, it has a returnTo attribute setting of page. When the system receives a Forward object that encapsulates a returnTo="page" attribute, the system automatically forwards to the page that was last used by the page group. Also, when forwarding to the original page, the system passes along the Form object that was originally submitted by the page when the page initiated the nesting in the first place. By way of a non-limiting example, when forwarding back to the jobDescription.jsp page, the system forwards along the JobDescriptionForm object that had been submitted to the jobDescriptionPage_help action method that nested the Help page group. Because of this, the jobDescription.jsp page will be completely restored to the condition that it was in when the user pressed the Help button.

By way of a non-limiting example of the scenario where a page group is used in the same way that a page would be used, an employeeInfoWizard page group is added to the application to gather data in the same way that the hiringWizard page group's name.jsp page gathered data. To begin with, an employeeInfoWizard page group is added to the application. The employeeInfoWizard page group contains pages that gather not only name information but also address and contact information. The EmployeeInfoWizard page group is a nestable page group and is therefore declared to be nestable with an annotation:

```
package employeeInfoWizard;
import com.bea.wlw.netui.pagegroup.PageGroup;
import com.bea.wlw.netui.pagegroup.Forward;
/**
 * @pgr:nestable
 */
public class EmployeeInfoWizard extends PageGroup
{
}
```

An EmployeeInfoWizard page group has a begin method that accepts an EmployeeInfoForm, uses the EmployeeInfoForm to initialize the page group and then forwards to the employeeInfoWizard group's name.jsp page:

```
package employeeInfoWizard;
import com.bea.wlw.netui.pagegroup.PageGroup;
import com.bea.wlw.netui.pagegroup.Forward;
import com.bea.wlw.netui.pagegroup.Form;
/**
 * @pgr:nestable
 */
public class EmployeeInfoWizard extends PageGroup
{
    protected String firstName;
    protected String lastName;
    protected String street;
    protected String city;
    protected String state;
    protected String zip;
    protected String homeTelephone;
    protected String workTelephone;
    protected String email;
    /**
     * @begin
     * @pgr:forward name="getName" path="name.jsp"
     */
    public Forward begin(EmployeeInfoForm form)
    {
        firstName = form.getFirstName( );
        lastName = form.getLastName( );
        street = form.getStreet( );
        city = form.getCity( );
        state = form.getState( );
        zip = form.getzip( );
        homeTelephone = form.getHomeTelephone( );
        workTelephone = form.getWorkTelephone( );
        email = form.getEmail( );
        return new Forward("getName");
    }
    public static class EmployeeInfoForm extends Form
    {
        protected String firstName;
        protected String lastName;
        protected String street;
        protected String city;
        protected String state;
        protected String zip;
        protected String homeTelephone;
        protected String workTelephone;
        protected String email;
        public String getFirstName( )
        {
            return firstName;
        }
        public void setFirstName(String firstName)
        {
            this.firstName;
        }
        public String getLastName( )
        {
            return lastName;
        }
        public void setLastName(String lastName)
        {
            this.lastName = lastName;
        }
        public String getStreet( )
        {
            return street;
        }
        public void setStreet(String street)
        {
            this.street = street;
        }
        public String getCity( )
        {
            return city;
        }
        public void setCity(String city)
        {
            this.city = city;
        }
        public String getState( )
        {
            return state;
        }
        public void setState(String state)
        {
            this.state = state;
        }
        public String getZip( )
        {
            return zip;
        }
        public void setZip(String zip)
        {
            this.zip = zip;
        }
        public String getHomeTelephone( )
        {
            return homeTelephone;
        }
        public void setHomeTelephone(String homeTelephone)
        {
            this.homeTelephone = homeTelephone;
        }
        public String getWorkTelephone( )
        {
            return workTelephone;
        }
        public void setWorkTelephone(String workTelephone)
        {
            this.workTelephone = workTelephone;
        }
        public String getEmail( )
        {
            return email;
        }
        public void setEmail(String email)
        {
            this.email = email;
        }
    }
}
```

Next, the HiringWizard page group is modified to nest the employeeInfoWizard page group instead of forwarding to the hiringWizard page group's name.jsp page:

```
package hiringWizard;
import java.util.Date;
import com.bea.wlw.netui.pagegroup.PageGroup;
import com.bea.wlw.netui.pagegroup.Forward;
import com.bea.wlw.netui.pagegroup.Form;
import hiringService.HiringService;
import help.Help;
import employeeInfoWizard.EmployeeInfoWizard;
public class HiringWizard extends PageGroup
{
    protected String firstName;
    protected String lastName;
    protected String title;
    protected Date startDate;
    /**
     * @wlw:control
     */
    HiringService hiringService;
    /**
     * @pgr:begin
     * @pgr:forward name="getName"
     *
     path="/employeeInfoWizard/EmployeeInfoWizard.pgr"
     */
    public Forward begin( )
    {
        EmployeeInfoWizard.EmployeeInfoForm form =
            EmployeeInfoWizard.EmployeeInfoForm( );
        form.setFirstName(firstName);
        form.setLastName(lastName);
        return new Forward("getName", form);
    }
    /**
     * @pgr:action
     * @pgr:forward name="getJobDesc"
     path="jobDescription.jsp"
     */
    public Forward namePage__next(NameForm form)
    {
        firstName = form.getFirstName( );
        lastName = form.getLastName( );
        JobDescriptionForm jobDescForm = new
        JobDescriptionForm( );
        return new Forward("getJobDesc", jobDescForm);
    }
    /**
     * @pgr:action
     * @pgr:forward name="getName"
     *
     path="/employeeInfoWizard/EmployeeInfoWizard.pgr"
     */
    public Forward jobDescPage__previous(JobDescriptionForm
    form)
    {
        title = form.getTitle( );
        startDate = form.getStartDate( );
        EmployeeInfoWizard.EmployeeInfoForm form =
            EmployeeInfoWizard.EmployeeInfoForm( );
        form.setFirstName(firstName);
        form.setLastName(lastName);
        return new Forward("getName", form);
    }
    /**
     * @pgr:action
     * @pgr:forward name="getConfirm" path="confirmation.jsp"
     */
    public Forward jobDescPage__next(JobDescriptionForm form)
    {
        title = form.getTitle( );
        startDate = form.getStartDate( );
        HireForm hireForm = new HireForm( );
        hireForm.setFirstName(firstName);
        hireForm.setLastName(lastName);
        hireForm.setTitle(title);
        hireForm.setStartDate(startDate);
        return new Forward("getConfirm", hireForm);
    }
    /**
     * @pgr:action
     * @pgr:forward name="readyForNextCandidate"
     *
     path="/employeeInfoWizard/EmployeeInfoWizard.pgr"
     * @pgr:catch type="com.acme.WorkflowException"
     method="onError"
     */
    public Forward confirmationPage__hire(HireForm form)
    throws Exception
    {
        hiringService.hire(firstName, lastName, title,
        startDate);
        firstName = null;
        lastName = null;
        title = null;
        startDate = null;
        EmployeeInfoWizard.EmployeeInfoForm form =
            EmployeeInfoWizard.EmployeeInfoForm( );
        form.setFirstName(firstName);
        form.setLastName(lastName);
        return new Forward("readyForNextCandidate", form);
    }
    /**
     * @pgr:action
     * @pgr:forward name="getHelp" path="/help/Help.pgr"
     */
    public Forward jobDescriptionPage__help( )
    {
        Help.HelpContextForm helpForm = new
        Help.HelpContextForm( );
        helpForm.setHelpContextId(Help.HelpContextForm.HIRING__
        WIZARD);
        return new Forward("getHelp", helpForm);
    }
    /**
     * @pgr:action
     * @pgr:forward name="returnToPage" returnTo="page"
     */
    public Forward help__done( )
    {
        return new Forward("returnToPage");
    }
    /**
     * @pgr:exceptionHandler
     * @pgr:forward name="error" path="error.jsp"
     */
    Protected Forward onError(Exception e,
                              String errorMethodName,
                              String messageKey,
                              String message,
                              Form form)
    {
        // TODO: Add some code to handle error
        return new Forward("error");
    }
}
```

Like the Help page group, the EmployeeInfoWizard page group returns from nesting by having an action method return a Forward that encapsulates a returnAction attribute. However, unlike the Help page group, the EmployeeInfoWizard page group returns data to its nester. To indicate to the system the type of the form that will hold the data to be returned, a returnFormType attribute is used:

```
package employeeInfoWizard;
import com.bea.wlw.netui.pagegroup.PageGroup;
import com.bea.wlw.netui.pagegroup.Forward;
import com.bea.wlw.netui.pagegroup.Form;
/**
 * @pgr:nestable
 */
public class EmployeeInfoWizard extends PageGroup
{
    protected String firstName;
```

```
            protected String lastName;
            protected String street;
            protected String city;
            protected String state;
            protected String zip;
            protected String homeTelephone;
            protected String workTelephone;
            protected String email;
            /**
             * @begin
             * @pgr:forward name="getName" path="name.jsp"
             */
            public Forward begin(EmployeeInfoForm form)
            {
                firstName = form.getFirstName( );
                lastName = form.getLastName( );
                street = form.getStreet( );
                city = form.getCity( );
                state = form.getState( );
                zip = form.getZip( );
                homeTelephone = form.getHomeTelephone( );
                workTelephone = form.getWorkTelephone( );
                email = form.getEmail( );
                return new Forward("getName");
            }
            /**
             * @pgr:action
             * @pgr:forward    name="done"
             *                 returnAction="employeeInfo_done"
             *                 returnFormType="EmployeeInfoForm"
             */
            public Forward confirmationPage_done( )
            {
                EmployeeInfoForm form = new EmployeeInfoForm( );
                form.setFirstName(firstName);
                form.setLastName(lastName);
                form.setStreet(street);
                form.setCity(city);
                form.setState(state);
                form.setZip(zip);
                form.setHomeTelephone(homeTelephone);
                form.setWorkTelephone(workTelephone);
                form.setEmail(email);
                return new Forward("done", form);
            }
            public static class EmployeeInfoForm extends Form
            {
                protected String firstName;
                ...
                public String getFirstName( )
                {
                    return firstName;
                }
                public void setFirstName(String firstName)
                {
                    this.firstName;
                }
                ...
            }
        }
```

The HiringWizard page group can be modified to change the namePage_next action method that would have been invoked by the HiringWizard group's name.jsp page. The namePage_next action method is changed to be an employeeInfo_done action method that accepts an argument of type EmployeeInfoWizard.EmployeeInfoForm:

```
package hiringWizard;
import java.util.Date;
import com.bea.wlw.netui.pagegroup.PageGroup;
import com.bea.wlw.netui.pagegroup.Forward;
import com.bea.wlw.netui.pagegroup.Form;
import hiringService.HiringService;
import help.Help;
import employeeInfoWizard.EmployeeInfoWizard;
public class HiringWizard extends PageGroup
{
    protected String firstName;
    protected String lastName;
    protected String title;
    protected Date startDate;
    /**
     * @wlw:control
     */
    HiringService hiringService;
    /**
     * @pgr:begin
     * @pgr:forward name="getName"
     *
     path="/employeeInfoWizard/EmployeeInfoWizard.pgr"
     */
    public Forward begin( )
    {
        EmployeeInfoWizard.EmployeeInfoForm form =
            EmployeeInfoWizard.EmployeeInfoForm( );
        form.setFirstName(firstName);
        form.setLastName(lastName);
        return new Forward("getName", form);
    }
    /**
     * @pgr:action
     * @pgr:forward name="getJobDesc"
     path="jobDescription.jsp"
     */
    public Forward
    employeeInfo_done(EmployeeInfoWizard.EmployeeInfoForm
    form)
    {
        firstName = form.getFirstName( );
        lastName = form.getLastName( );
        JobDescriptionForm jobDescForm = new
        JobDescriptionForm( );
        return new Forward("getJobDesc", jobDescForm);
    }
    /**
     * @pgr:action
     * @pgr:forward name="getName"
     *
     path="/employeeInfoWizard/EmployeeInfoWizard.pgr"
     */
    public Forward jobDescPage_previous(JobDescriptionForm
    form)
    {
        title = form.getTitle( );
        startDate = form.getStartDate( );
        EmployeeInfoWizard.EmployeeInfoForm form =
            EmployeeInfoWizard.EmployeeInfoForm( );
        form.setFirstName(firstName);
        form.setLastName(lastName);
        return new Forward("getName", form);
    }
    /**
     * @pgr:action
     * @pgr:forward name="getConfirm" path="confirmation.jsp"
     */
    public Forward jobDescPage next(JobDescriptionForm form)
    {
        title = form.getTitle( );
        startDate = form.getStartDate( );
        HireForm hireForm = new HireForm( );
        hireForm.setFirstName(firstName);
        hireForm.setLastName(lastName);
        hireForm.setTitle(title);
        hireForm.setStartDate(startDate);
        return new Forward("getConfirm", hireForm);
    }
    /**
     * @pgr:action
     * @pgr:forward name="readyForNextCandidate"
     *
     path="/employeeInfoWizard/EmployeeInfoWizard.pgr"
     * @pgr:catch type="com.acme.WorkflowException"
```

```
        method="onError"
        */
    public Forward confirmationPage__hire(HireForm form)
    throws Exception
    {
        hiringService.hire(firstName, lastName, title,
            startDate);
        firstName = null;
        lastName = null;
        title = null;
        startDate = null;
        EmployeeInfoWizard.EmployeeInfoForm form =
            EmployeeInfoWizard.EmployeeInfoForm( );
        form.setFirstName(firstName);
        form.setLastName(lastName);
        return new Forward("readyForNextCandidate", form);
    }
    /**
     * @pgr:action
     * @pgr:forward name="getHelp" path="/help/Help.pgr"
     */
    public Forward jobDescriptionPage__help( )
    {
        Help.HelpContextForm helpForm = new
        Help.HelpContextForm( );
        helpForm.setHelpContextId(Help.HelpContextForm.HIRING_
        WIZARD);
        return new Forward("getHelp", helpForm);
    }
    /**
     * @pgr:action
     * @pgr:forward name="returnToPage" returnTo="page"
     */
    public Forward help__done( )
    {
        return new Forward("returnToPage");
    }
    /**
     * @pgr:exceptionHandler
     * @pgr:forward name="error" path="error.jsp"
     */
    protected Forward onError(Exception e,
                              String errorMethodName,
                              String messageKey,
                              String message,
                              Form form)
    {
        // TODO: Add some code to handle error
        return new Forward("error");
    }
}
```

By way of a non-limiting example of the scenario in which a page group can support interruption of a web flow to ensure that important preconditions are met before continuing the web flow. In this example, the HiringWizard page group's confirmationPage_hire action method has a precondition that can be satisfied before the hiring workflow may be initiated. The precondition is that the web site user can be logged in before initiating a hiring workflow.

To accomplish logins, the humanResources web application can contain a login page group. The confirmationPage_ hire action method can test to see if the web site user is logged in. If the user is not logged in, then the confirmationPage_hire method nests the Login page group to login the user:

```
package hiringWizard;
import java.util.Date;
import com.bea.wlw.netui.pagegroup.PageGroup;
import com.bea.wlw.netui.pagegroup.Forward;
import com.bea.wlw.netui.pagegroup.Form;
import hiringService.HiringService;
import help.Help;
import employeeInfoWizard.EmployeeInfoWizard;
import com.acme.User;
public class HiringWizard extends PageGroup
{
    protected String firstName;
    protected String lastName;
    protected String title;
    protected Date startDate;
    /**
     * @wlw:control
     */
    HiringService hiringService;
    User user;
    /**
     * @pgr:begin
     * @pgr:forward name="getName"
     *
    path="/employeeInfoWizard/EmployeeInfoWizard.pgr"
     */
    public Forward begin( )
    {
        EmployeeInfoWizard.EmployeeInfoForm form =
            EmployeeInfoWizard.EmployeeInfoForm( );
        form.setFirstName(firstName);
        form.setLastName(lastName);
        return new Forward("getName", form);
    }
    /**
     * @pgr:action
     * @pgr:forward name="getJobDesc"
    path="jobDescription.jsp"
     */
    public Forward
    employeeInfo__done(EmployeeInfoWizard.EmployeeInfoForm
    form)
    {
        firstName = form.getFirstName( );
        lastName = form.getLastName( );
        JobDescriptionForm jobDescForm = new
        JobDescriptionForm( );
        return new Forward("getJobDesc", jobDescForm);
    }
    /**
     * @pgr:action
     * @pgr:forward name="getName"
     *
    path="/employeeInfoWizard/EmployeeInfoWizard.pgr"
     */
    public Forward jobDescPage__previous(JobDescriptionForm
    form)
    {
        title = form.getTitle( );
        startDate = form.getStartDate( );
        EmployeeInfoWizard.EmployeeInfoForm form =
            EmployeeInfoWizard.EmployeeInfoForm( );
        form.setFirstName(firstName);
        form.setLastName(lastName);
        return new Forward("getName", form);
    }
    /**
     * @pgr:action
     * @pgr:forward name="getConfirm" path="confirmation.jsp"
     */
    public Forward jobDescPage_next(JobDescriptionForm form)
    {
        title = form.getTitle( );
        startDate = form.getStartDate( );
        HireForm hireForm = new HireForm( );
        hireForm.setFirstName(firstName);
        hireForm.setLastName(lastName);
        hireForm.setTitle(title);
        hireForm.setStartDate(startDate);
        return new Forward("getConfirm", hireForm);
    }
    /**
     * @pgr:action
     * @pgr:forward name="readyForNextCandidate"
     *
```

```
path="/employeeInfoWizard/EmployeeInfoWizard.pgr"
 * @pgr:forward name="getLogin" path="/login/Login.pgr"
 * @pgr:catch type="com.acme.WorkflowException"
method="onError"
 */
public Forward confirmationPage_hire(HireForm form)
throws Exception
{
    if (user == null)
    {
        return new Forward("getLogin");
    }
    hiringService.hire(firstName, lastName, title,
    startDate);
    firstName = null;
    lastName = null;
    title = null;
    startDate = null;
    EmployeeInfoWizard.EmployeeInfoForm form =
        EmployeeInfoWizard.EmployeeInfoForm( );
    form.setFirstName(firstName);
    form.setLastName(lastName);
    return new Forward("readyForNextCandidate", form);
}
/**
 * @pgr:action
 * @pgr:forward name="getHelp" path="/help/Help.pgr"
 */
public Forward jobDescriptionPage_help( )
{
    Help.HelpContextForm helpForm = new
    Help.HelpContextForm( );
    helpForm.setHelpContextId(Help.HelpContextForm.HIRING_
    WIZARD);
    return new Forward("getHelp", helpForm);
}
/**
 * @pgr:action
 * @pgr:forward name="returnToPage" returnTo="page"
 */
public Forward help_done( )
{
    return new Forward("returnToPage");
}
/**
 * @pgr:exceptionHandler
 * @pgr:forward name="error" path="error.jsp"
 */
protected Forward onError(Exception e,
                          String errorMethodName,
                          String messageKey,
                          String message,
                          Form form)
{
    // TODO: Add some code to handle error
    return new Forward("error");
}
}
```

The Login page group is a simple page group that returns a UserForm that contains a User object that corresponds to the user that logged in:

```
package login;
import com.bea.wlw.netui.pagegroup.PageGroup;
import com.bea.wlw.netui.pagegroup.Forward;
import com.bea.wlw.netui.pagegroup.Form;
import com.acme.User;
import loginService.LoginService;
/**
 * pgr:nestable
 */
public class Login extends PageGroup
{
    /**
```

```
 * @wlw:control
 */
protected LoginService loginService;
/**
 * @pgr:begin
 * @pgr:forward name="getLogin" path="login.jsp"
 */
public Forward begin( )
{
return new Forward("getLogin");
}
/**
 * @pgr:action
 * @pgr:forward         name="success"
 *                      returnAction="login_done"
 *                      returnFormType="UserForm"
 * @pgr:forward name="failure" path="failure.jsp"
 */
public Forward loginPage login(LoginForm form)
{
    User user = loginService.login(form.getUserName( ),
                                   form.getPassword( ));
    if(user != null)
    {
        UserForm userForm = new UserForm( );
        userForm.setUser(user);
        return new Forward("success", userForm);
    }
    else
    {
        return new Forward("failure");
    }
}
public static class LoginForm extends Form
{
    protected String userName;
    protected String password;
    public String getUserName( )
    {
        return userName;
    }
    public void setUserName(String userName)
    {
        this.userName = userName;
    }
    public String getPassword( )
    {
        return password;
    }
    public void setPassword(String password)
    {
        this.password = password;
    }
}
public static class UserForm extends Form
{
    protected User user;
    public User getUser( )
    {
        return user;
    }
    public void setUser(User user)
    {
        this.user = user;
    }
}
}
```

Upon return to the HiringWizard page group from the Login page group, the system executes the login_done action method. The login_done method sets the user field, and then causes a forward back to the confirmationPage_hire action method:

```
/**
 * @pgr:action
 * @pgr:forward name="returnToAction" returnTo="action"
 */
public Forward login__done(UserForm form)
{
    user = form.getUser( );
    return new Forward("returnToAction");
}
}
```

The confirmationPage_hire action method is then re-executed. During the second execution, the confirmationPage_hire method will detect that the user field has been set, and will continue on to initiate the hiring workflow.

In one embodiment, a global page group is a place to put user interface control code that can be reachable by all pages and page groups of a web site. By way of a non-limiting example, the global page group is a place to put a web site search action method that is used by a page template that gets included by all of the pages of a web site. Like a regular page group, the global page group is defined in a specially-named file. The file is named global.application, and there can be one such file per web application. Like regular page groups, the global page group is defined as an annotated Java class. By way of a non-limiting example, the human resource application's global page group may defined as:

```
import com.bea.wlw.netui.pagegroup.Controller;
public class GlobalApp extends Controller
{
    ...
}
```

Global page groups can contain lifecycle methods. Global page groups inherit empty implementations of the lifecycle methods from Controller, and may override the implementations to suit the needs of the application. The lifecycle methods are called by the system and provide important notifications of application status. By way of a non-limiting example, the Controller class contains empty implementations of onAppInit and onAppDestroy, and the GlobalApp class may override these methods as follows:

```
import com.bea.wlw.netui.pagegroup.Controller;
public class GlobalApp extends Controller
{
    public onAppInit( )
    {
        ...
    }
    public onAppDestroy( )
    {
        ...
    }
}
```

In one embodiment, the global page group class may contain action methods and annotations may also be used. By way of a non-limiting example, GlobalApp may contain a search action method:

```
import com.bea.wlw.netui.pagegroup.Controller;
import com.bea.wlw.netui.pagegroup.Forward;
import com.bea.wlw.netui.pagegroup.Form;
import com.acme.SearchService;
import com.acme.SearchResults;
public class GlobalApp extends Controller
{
/**
 * @wlw:control
 */
protected SearchService service;
public onAppInit( )
{
    ...
}
public onAppDestroy( )
{
    ...
}
/**
 * @pgr:action
 * @pgr:forward name="showSearchResults"
 path="/searchResults.jsp"
 */
public Forward search(SearchForm form)
{
    SearchResults results =
    searchService.search(form.getQuery( ));
    SearchResultsForm resultsForm = new
    SearchResultsForm( );
    resultsForm.setSearchResults(results);
    return new Forward("showSearchResults");
}
public static class SearchForm extends Form
{
    protected String query;
    public String getQuery( )
    {
        return query;
    }
    public void setQuery(String query)
    {
        this.query = query;
    }
}
public static class SearchResultForm extends Form
{
    protected SearchResults searchResults;
    public SearchResults getSearchResults( )
    {
        return searchResults;
    }
    public void setSearchResults(SearchResults
    searchResults)
    {
        this.searchResults = searchResults;
    }
    public String getResult(int index)
    {
        ...
    }
}
}
```

Note that the path provided for the showSearchResults forward begins with a slash. This is because web application relative addressing can be used in the global page group since the global page group is not associated with any pages.

In one embodiment, when a page in a page group requests that an action be performed, the system looks for the action method in the page's page group controller class. If the system is unable to find an action method for the action within the page's page group controller class, then the system searches the global page group controller class for an action method. By way of a non-limiting example, the name.jsp page of the hiringWizard page group could have a search form.

When a user presses the Search button the system looks for the action method to service the search request. Because the HiringWizard page group does not contain a search action method, the system will look in the GlobalApp page group to find a search method. Upon finding the search method in the GlobalApp page group, the system will execute that method.

The search method in the GlobalApp page group returns a Forward object that refers to a searchResults.jsp page. The searchResults.jsp page is file that is located in the web application root directory. It can contain a Done button which, when selected by a user, causes a searchPage_done action method to be sent to the controller. In response, the controller looks for a searchPage_done action method in the HiringWizard page group. Because the HiringWizard page group does not contain a searchPage_done action method, the system looks for a searchPage_done action method in the GlobalApp page group. The GlobalApp page group contains such a method and it looks like:

```
import com.bea.wlw.netui.pagegroup.Controller;
import com.bea.wlw.netui.pagegroup.Forward;
import com.bea.wlw.netui.pagegroup.Form;
import com.acme.SearchService;
import com.acme.SearchResults;
public class GlobalApp extends Controller
{
    /**
     * @wlw:control
     */
    protected SearchService service;
    public onAppInit( )
    {
        ...
    }
    public onAppDestroy( )
    {
        ...
    }
    /**
     * @pgr:action
     * @pgr:forward name="showSearchResults"
       path="/searchResults.jsp"
     */
    public Forward search(SearchForm form)
    {
        SearchResults results =
        searchService.search(form.getQuery( ));
        SearchResultsForm resultsForm = new
        SearchResultsForm( );
        resultsForm.setSearchResults(results);
        return new Forward("showSearchResults");
    }
    /**
     * @pgr:action
     * @pgr:forward name="returnToPage" returnTo="page"
     */
    public Forward searchPage__done( )
    {
        return new Forward("returnToPage");
    }
    public static class SearchForm extends Form
    {
        protected String query;
        public String getQuery( )
        {
            return query;
        }
        public void setQuery(String query)
        {
            this.query = query;
        }
    }
    public static class SearchResultForm extends Form
    {
        protected SearchResults searchResults;
        public SearchResults getSearchResults( )
        {
            return searchResults;
        }
        public void setSearchResults(SearchResults
        searchResults)
        {
            this.searchResults = searchResults;
        }
        public String getResult(int index)
        {
            ...
        }
    }
}
```

In this example, the searchPage_done action method returns a Forward object that encapsulates a returnTo="page" attribute. Because of this attribute the system will return the user to the HiringWizard page group's name.jsp page that the user was viewing when the user originally requested the search.

In on embodiment, the System provides several classes that maybe used by page group developers:

TABLE 1

Exemplary Classes in an Embodiment

| CLASS | DESCRIPTION |
| --- | --- |
| PageGroup | The base class for all page group controller classes |
| Forward | Encapsulates URLs |
| Form | The base class for all forms |

The system provides several annotations that may be used by page group developers. The annotations can include the following:

TABLE 2

Exemplary Annotations in an Embodiment

| NAME | WHERE USED | DESCRIPTION |
| --- | --- | --- |
| @pgr:action | Action methods | Designates an action method. |
| @pgr:forward | Action methods Page group class | Provides the information that will be encapsulated by a Forward object. |
| @pgr:catch | Action methods Page group class | Provides the information to be used by the system to catch exceptions and possibly route them to error handlers. |
| @pgr:exceptionHandler | Error handler methods | Designates an error handler method. |
| @pgr:nestable | Page group class | Designates a nestable page group. |
| @wlw:control | Instance members | Indicates that an instance member references a Workshop control. |
| @pgr:validation | Page group class | Describes form validation checks to be performed by the system. |

The @pgr:forward annotation can be used to describe a location to which the system should forward. The location may be a page, a page group or an action method. The forward annotation is usually applied to action methods, but may also be applied to a page group class. When applied to an action method, the forward annotation describes a local forward. When applied to a page group class, the forward annotation describes a global forward. Although local and global forwards work the same way, they are given different representations within the various views of the IDE. The forward annotation has the following attributes:

TABLE 3

Exemplary @pgr:forward Annotation Attributes in an Embodiment

| NAME | REQUIRED | VALUES | DESCRIPTION |
| --- | --- | --- | --- |
| name | Yes | Any string | The logical name of a forward. |
| path | Either this attribute, the returnAction attribute or the returnTo attribute can be specified. | A string which maps to either a page or page group in a web application, an action method within a page group or to a resource somewhere on the web | The path to a resource to which the system should forward. The path may be to a resource in the web application or to a resource outside of the web application. If the path begins with a protocol such as "http:", then the system will look outside of the web application for the resource. If the path begins with a "/" then the system will use web application root relative addressing to locate the resource. If the path does not begin with a protocol or a "/" then the system will use page group relative addressing to locate the resource. If the path does not begin with a protocol or a "/" then the system will use page group relative addressing to locate the resource. |
| returnAction | Either this attribute, the path attribute or the returnTo attribute can be specified. | The name of an action to invoke upon return to a nesting page group | This specifies the name of an action in the nesting page group that should be invoked upon return to the nesting page group. In the case where multiple actions with names equal to that of returnAction exist, either returnFormType or the type of the variable specified by returnForm will be used to disambiguate and select the correct action in the nesting page group. |
| returnForm Type | No. May not be specified returnForm is specified. | The name of a Form type | This specifies the type of the Form object that will be returned by the action to the nesting page group. If this attribute is not specified, then the type of the Form object returned by the action method will be determined by examining the type of the instance member identified by returnForm. |
| returnForm | No. May not be specified returnForm is specified. | The name of a page group instance member | The name of a page group instance member to use as the form data upon return to a nesting page group. Use of the instance member also means use of the instance member's type to help determine which action method to select upon return to the nesting page group. |
| redirect | No. May only be used when path is used. | true or false. false is the default value. | When true, navigation is performed using the Servlet redirect method. |
| returnTo | Either this attribute can be set, the path attribute can be set or the returnAction attribute can be set. | page or action. | When set to page, the system automatically forwards to the last page used by the page group. This is useful for return to page nesting scenarios. When set to action, the system automatically forwards to the action that preceded the call of this action. This is useful for preconditions. |

The @prg:catch annotation describes an exception catch that the system should perform. The @prg:catch annotation has the following attributes:

TABLE 4

Exemplary @prg:catch Annotation Attributes in an Embodiment

| NAME | REQUIRED | VALUES | DESCRIPTION |
|---|---|---|---|
| type | Yes | Any fully-qualified Java exception type | This specifies the Java type of the exceptions that should be caught |
| path | Either this attribute or method attribute can be specified | A string which maps to either a page or page group in a web application, and action method within a page group or to a resource somewhere on the web | This specifies the resource to which the system should forward when it catches an exception of type. |
| method | Either this attribute or path attribute can be specified | The name of an exception handler method which is designated with a @pgr:exceptionHandler annotation | This specifies the name of an exception handler method that should be called if an exception of type is caught. |
| message | No | Any string which provides useful information about the exception | This is an error message that may be used to provide helpful information about the exception. |
| message Key | No | A key that may be used to select a message from a message map. | This is a key that is used to select a message from a map. Typically this key is used to enable internationalization of messages. |

The @prg:validation annotation describes a form validation check to be performed by the system. The validation annotation has the following attributes:

TABLE 5

Exemplary @prg:validation Annotation Attributes in an Embodiment

| NAME | REQUIRED | VALUES | DESCRIPTION |
|---|---|---|---|
| property | Yes | Name of property in Form class | The name of a property in the form class |
| required | No | true or false | If true, then the associated property can be set. |
| pattern | No | An expression that describes allowable settings of the property | An expression that describes allowable settings of the property |

One embodiment maybe implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-based system including a computer processor for a distributed web application, comprising:

a page flow model that controls behavior of the distributed web application;

one or more page groups, wherein each page group is a set of related and interacting web application files, wherein each page group contains control logic that implements navigation decisions using one or more action methods, wherein each action method is a method that contains an action annotation, wherein at least one said action method in a page group contains a forward annotation that indicates a name of a web application file within the page group, wherein the action method returns a forward object that indicates to the page flow model the web application file the action method wants to navigate to, and wherein the forward object is constructed based on the forward annotation.

2. The computer-based system of claim 1 wherein:
the at least one action method implements code that results in website navigation, passing data, and/or invoking back-end business logic.

3. The computer-based system of claim 1 wherein:
each of the one or more page groups controls page flow between pages and other page groups.

4. The computer-based system of claim 1 wherein:
one of the one or more page groups can be nested within another page group.

5. The computer-based system of claim 1 wherein:
the page group is a set of functionally related web pages.

6. The computer-based system of claim 1, further comprising:
a global page group to provide fallback action methods for the one or more page groups.

7. The computer-based system of claim 1 wherein:
the at least one page group includes an action method that is bound to a form; and wherein the form encapsulates data that was posted to the page group by a web browser or other client.

8. A method for supporting a distributed web application, comprising:

controlling, via a page flow model, behavior of the distributed web application;

providing one or more page groups, wherein each page group is a set of related and interacting web application files, wherein each page group contains control logic that implements navigation decisions using one or more action methods, wherein each action method is a method that contains an action annotation, containing, in at least one said action method in a page group, a forward annotation that indicates a name of a web application file within the page group, wherein the action method returns a forward object that indicates to the page flow model the web application file the action method wants to navigate to, and wherein the forward object is constructed based on the forward annotation.

9. The method of claim 8 further comprising:
implementing code, in the at least one action method, that can result in website navigation, passing data, and/or invoking back-end business logic.

10. The method of claim 8 further comprising:
controlling, via each of the one or more page groups, web page flow between pages and other page groups.

11. The method of claim 8 further comprising:
nesting a page group within another page group.

12. The method of claim 8 wherein:
the page group is a set of functionally related web pages.

13. The method of claim 8, further comprising:
providing a global page group to provide fallback action methods for the page.

14. The method of claim 8 wherein:
including, in the at least one page, an action method that is bound to a form; and
wherein the form encapsulates data that was posted to the web page group by a web browser or other client.

15. A machine readable medium having instructions stored thereon that when executed by a processor cause a system to:
control, via a page flow model, behavior of the distributed web application;

provide one or more page groups, wherein each page group is a set of related and interacting web application files, wherein each page group contains control logic that implements navigation decisions using one or more action methods, wherein each action method is a method that contains an action annotation, contain, in at least one said action method in a page group, a forward annotation that indicates a name of a web application file within the page group, wherein the action method returns a forward object that indicates to the page flow model the web application file the action method wants to navigate to, and wherein the forward object is constructed based on the forward annotation.

16. The machine readable medium of claim 15 further comprising instructions stored thereon that when executed by a processor cause a system to:
implements code, in the at least one action method, that can result in website navigation, passing data, and/or invoking back-end business logic.

17. The machine readable medium of claim 15 further comprising instructions stored thereon that when executed by a processor cause a system to:
control, via each of the one or more page groups, page flow between pages and other page groups.

18. The machine readable medium of claim 15 further comprising instructions stored thereon that when executed by a processor cause a system to:
nesting a page group within another web page group.

19. The machine readable medium of claim 15 wherein:
the page group is a set of functionally related web pages.

20. The machine readable medium of claim 15, further comprising instructions stored thereon that when executed by a processor cause a system to:
provide a global page group to provide fallback action methods for the web page.

21. The machine readable medium of claim 15 further comprising instructions stored thereon that when executed by a processor cause a system to:
include, in the at least one page, an action method that is bound to a form; and wherein the form encapsulates data that was posted to the web page group by a web browser or other client.

* * * * *

UNITED STATES PATENT AND TRADEMARK OFFICE
CERTIFICATE OF CORRECTION

PATENT NO. : 7,774,697 B2
APPLICATION NO. : 10/780340
DATED : August 10, 2010
INVENTOR(S) : Daryl B. Olander et al.

Page 1 of 1

It is certified that error appears in the above-identified patent and that said Letters Patent is hereby corrected as shown below:

In column 3, line 38, delete "page_a.jsp" and insert -- page_A.jsp --, therefor.

In column 6, line 56, delete "payAjustment" and insert -- payAdjustment --, therefor.

In column 8, line 18, delete "corn." and insert -- com. --, therefor.

In column 8, line 24, delete "maybe" and insert -- may be --, therefor.

In column 10, line 19, delete "name.jsp'sNext" and insert -- name.jsp's Next --, therefor.

In column 10, line 25, delete "maybe" and insert -- may be --, therefor.

In column 26, line 40, delete "Protected" and insert -- protected --, therefor.

In column 36, line 25, delete "maybe" and insert -- may be --, therefor.

In column 39, line 53, delete "maybe" and insert -- may be --, therefor.

Signed and Sealed this
Third Day of May, 2011

David J. Kappos
*Director of the United States Patent and Trademark Office*